US009162174B2

(12) United States Patent
Baseotto

(10) Patent No.: US 9,162,174 B2
(45) Date of Patent: Oct. 20, 2015

(54) AIR CLEANER ASSEMBLIES WITH FILTER ELEMENT AND METHOD FOR INSTALLING THE FILTER ELEMENT

(75) Inventor: Michel Baseotto, Hasselt (BE)

(73) Assignee: Donaldson Company, Inc., Minneapolis, MN (US)

( * ) Notice: Subject to any disclaimer, the term of this patent is extended or adjusted under 35 U.S.C. 154(b) by 189 days.

(21) Appl. No.: 13/698,106

(22) PCT Filed: May 17, 2011

(86) PCT No.: PCT/US2011/036796
§ 371 (c)(1),
(2), (4) Date: May 28, 2013

(87) PCT Pub. No.: WO2011/146474
PCT Pub. Date: Nov. 24, 2011

(65) Prior Publication Data
US 2013/0232934 A1    Sep. 12, 2013

Related U.S. Application Data

(60) Provisional application No. 61/345,844, filed on May 18, 2010.

(51) Int. Cl.
*B01D 46/00*  (2006.01)
*B01D 46/24*  (2006.01)
*B01D 46/52*  (2006.01)

(52) U.S. Cl.
CPC ........ *B01D 46/2414* (2013.01); *B01D 46/0005* (2013.01); *B01D 46/0086* (2013.01); *B01D 46/2411* (2013.01); *B01D 46/521* (2013.01); *B01D 2201/291* (2013.01);

(Continued)

(58) Field of Classification Search
CPC .......... B01D 46/2411; B01D 46/2414; B01D 2201/291; B01D 2201/296; B01D 2201/4046; B01D 2275/206; F01M 2013/0438
USPC ...................... 55/498, 510; 210/493.2, 493.5
See application file for complete search history.

(56) References Cited

U.S. PATENT DOCUMENTS 3,288,299 A    11/1966  Paton et al.
4,746,432 A     5/1988  Taki et al.
(Continued)

FOREIGN PATENT DOCUMENTS

DE            41 11 447        10/1992
DE         10 2004 025274      12/2004
(Continued)

OTHER PUBLICATIONS

International Search Report for International Application No. PCT/US2011/036796 mailed Aug. 22, 2011.

*Primary Examiner* — Robert Clemente
(74) *Attorney, Agent, or Firm* — Merchant & Gould P.C.

(57) ABSTRACT

According to the present disclosure, air cleaner assemblies, components, features and methods are described. A filter cartridge is characterized, that can be conveniently used as part of the system ensuring that a proper cartridge is installed in the housing, in a proper radial orientation and in a manner such that cartridge rotation is inhibited, in spite of the use of a radial seal. The cartridge can be configured to also be used with a housing that includes a utility conduit in an exterior surface thereof. Advantageous features and methods of assembly and use are described.

16 Claims, 32 Drawing Sheets

(52) U.S. Cl.
CPC .. *B01D 2201/313* (2013.01); *B01D 2201/4046* (2013.01); *B01D 2201/44* (2013.01); *B01D 2265/021* (2013.01); *B01D 2265/06* (2013.01); *B01D 2275/206* (2013.01)

(56) References Cited

U.S. PATENT DOCUMENTS

| | | | |
|---|---|---|---|
| 8,499,749 B2* | 8/2013 | Mosset et al. | 123/573 |
| 2010/0031940 A1* | 2/2010 | Mosset et al. | 123/573 |
| 2011/0132816 A1* | 6/2011 | Vasilescu | 210/90 |
| 2011/0272340 A1* | 11/2011 | Sasur et al. | 210/232 |

FOREIGN PATENT DOCUMENTS

| | | |
|---|---|---|
| DE | 20 2005 003046 | 7/2006 |
| EP | 0 206 336 | 12/1986 |
| EP | 0206336 A2 * | 12/1986 |
| EP | 0 754 483 | 1/1997 |
| FR | 2 879 944 | 6/2006 |
| WO | WO 02/053258 | 7/2002 |
| WO | WO 2008/045326 | 4/2008 |

* cited by examiner

AIR CLEANER ASSEMBLIES WITH FILTER ELEMENT AND METHOD FOR INSTALLING THE FILTER ELEMENT

This application is being filed on 17 May 2011, as a PCT International Patent application in the name of Donaldson Company, Inc., a U.S. national corporation, applicant for the designation of all countries except the US, and Michael Baseotto, a citizen of the Belgium, applicant for the designation of the US only. The present application includes the disclosure of, with edits, U.S. provisional application 61/345, 844, filed May 18, 2010. A claim of priority is made to U.S. provisional application 61/345,844 to the extent appropriate. The complete disclosure of U.S. provisional application 61/345,844 is incorporated herein by reference.

FIELD OF THE DISCLOSURE

The present disclosure relates to air cleaners. It particularly concerns air cleaner assemblies having a serviceable, i.e. removable and replaceable, main filter cartridge therein. The air cleaner assemblies of concern can be used, for example, as filters for engine in-take air for internal combustion engines, such as used on vehicles and other equipment. The assemblies, components, features and techniques described, relate to a provision of an advantageous fit between a portion of a cartridge and a portion of a housing.

BACKGROUND

Air cleaners are used to filter combustion intake air for internal combustion engines of a variety of vehicles and other equipment, such as: trucks; buses; off-road construction equipment; agriculture equipment; generator sets; etc. Such air cleaners typically include a housing with a removable and replaceable main filter cartridge positioned therein. The housing includes a service access cover, for selected access to an internally received filter cartridge, for servicing. The filter cartridge is typically serviced by being removed and by either: being replaced with a factory new cartridge; being refurbished and being reinstalled; or, by being replaced with a previously used, but refurbished, cartridge.

Issues relating to air cleaner arrangements with a serviceable filter cartridge include: ensuring proper installation and sealing; obtaining appropriate support for the filter cartridge within the air cleaner; ensuring against improper installation of a filter cartridge; providing for convenient installation and removal; and, providing for convenient manufacture and assembly.

Improvements in air cleaner assemblies and filter cartridges therefor, which are directed to these issues, are described herein.

SUMMARY

According to the present disclosure, air cleaner assemblies; components therefor, features thereof and methods of assembly and use are described. In general the air cleaner assemblies are improved with respect to selected features that help ensure: proper installation of an intended filter cartridge within a housing; interference fit to inhibit rotation of a cartridge once installed; and, in selected application, accommodation of a utility trough or conduit in a housing. There is no specific requirement that an air cleaner assembly, housing, cartridge or other component, feature, or method of assembly or use, include all of the features in detail and characterized herein, in order to obtain some benefit according to the present disclosure. Further, there is no requirement that an assembly, component, feature or method take advantage of all of the benefits available with techniques according to the present disclosure.

DETAILED DESCRIPTION

I. An Example a First Embodiment of an Air Cleaner Assembly and Features

FIGS. 1-16

Figure 1:
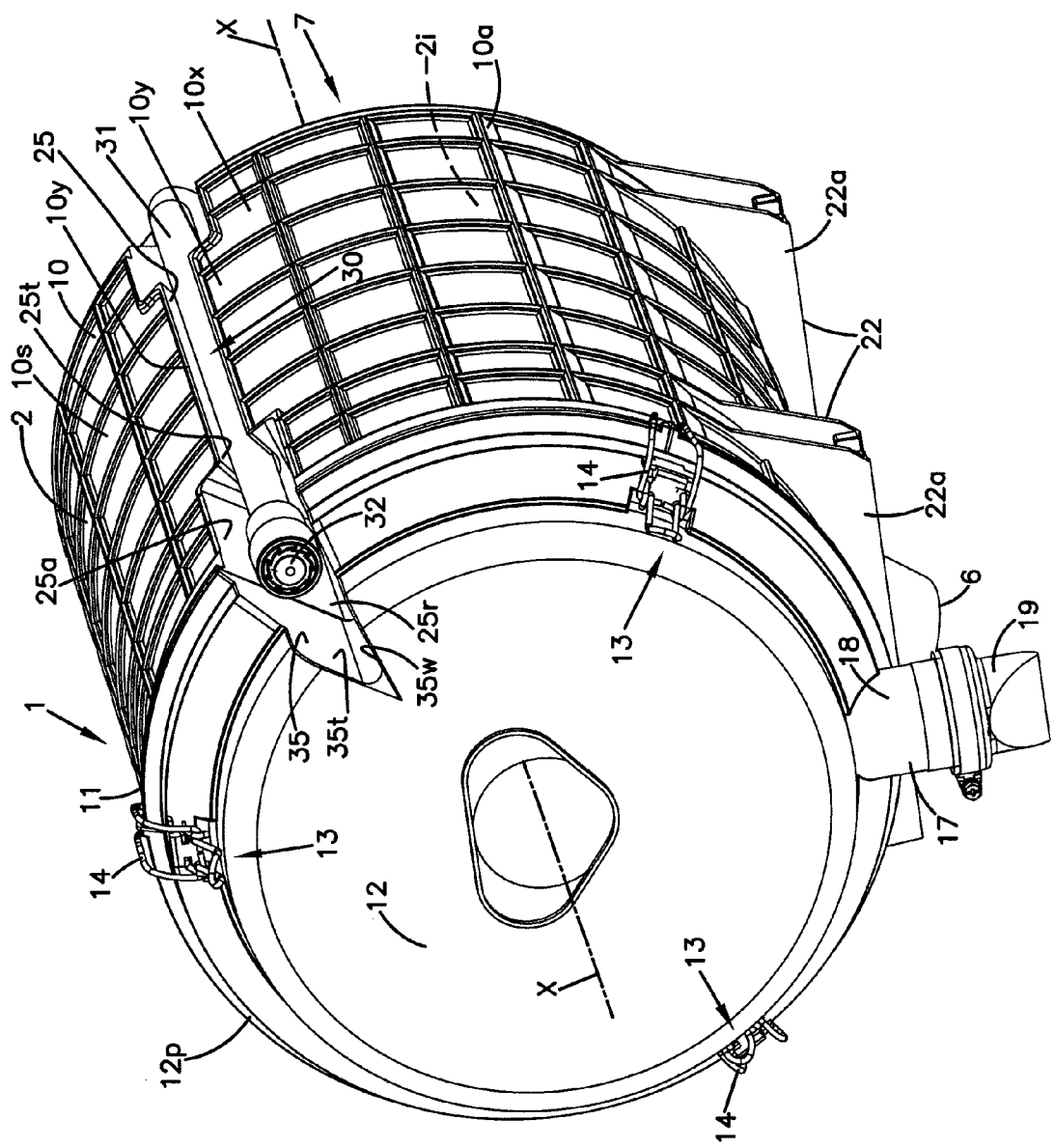
FIG. 1 is a schematic access end perspective view of an air cleaner assembly according to a first embodiment of the present disclosure.

The reference numeral 1, FIG. 1, generally indicates an air cleaner assembly according to an embodiment of the present disclosure. Air cleaner assembly 1 comprises a housing 2. In an interior 2i of the housing 2 would typically be operably positioned at least a main air filter cartridge, as discussed below.

In operation, air to be filtered is directed into the air cleaner assembly 1 through an air flow inlet arrangement, for example as indicated at 6. Within the air cleaner assembly 1, the air is passed through an internally received main air filter cartridge, as discussed below, with filtering. The filtered air is directed outwardly from the air cleaner assembly 1, in the example depicted through an outlet not viewable in FIG. 1, but located where indicated by numeral 7. From the outlet 7, filtered air is directed as needed, for example to an air in-take for an internal combustion engine. Thus, typically, the air cleaner assembly 1 would be used on a vehicle or other equipment as a combustion air cleaner assembly.

Still referring to FIG. 1, the housing 2 comprises a main housing body 10 having an open end 11, remote from outlet 7, with an access cover 12 mounted thereover. The access cover 12 is openable, allowing access to the interior 2i of the housing 2. Typically, the access cover 12 is fully removable from the open end 11 of the body 10. In the example shown, the access cover 12 is mounted in place by a latch arrangement 13 comprising overcenter wire latches 14.

The particular air cleaner assembly 1 depicted, includes an ejector arrangement 17 comprising ejector tube 18 and valve arrangement 19. The example valve arrangement 19 depicted comprises a typical duck-billed valve, for example as depicted in WO 2007/022171; U.S. Pat. No. 7,070,642; and, 6,039,778, incorporated herein by reference. Such valves are well-known. Alternative valves can be used.

In general, in use, as tube 18 begins to fill with a material such as water, evacuation through valve arrangement 19 allows for selected ejection of the collected material.

In a typical use, air cleaner assembly 1 will be positioned with tube 18 and valve 19 directed downwardly. For the particular assembly depicted, the ejection arrangement 17 is positioned on the access cover 12, although alternative locations are possible.

Referring to FIG. 1, it is noted that the housing 2 generally surrounds and defines a central axis X. The particular assembly 1 depicted is configured to be conveniently used when positioned so that axis X generally extends horizontally. However, many of the principles described herein can be applied with housing oriented for alternate positioning, assuming the appropriate modifications are made, for example in the location of, and direction of, any ejector arrangement 17.

Still referring to FIG. 1, the example housing 2 includes an optional mounting pad arrangement 22, comprising individual mounting pads 22a, in housing body 10, to facilitate securing the housing 2 in place on a vehicle or other equipment. Fastening can involve fastener arrangements such as bolts and/or mounting bands or combinations thereof.

Advantages to certain selected additional features of the air cleaner assembly 1 can be understood by considering certain issues presented by a typical environment of use. Referring to air cleaner assembly 1, FIG. 1, a typical environment of use would be on a vehicle such as a truck. The air cleaner assembly 1 would need to be mounted at a location where service access to access cover 12, and interior 2i, is readily provided. An example would be immediately behind the cab of the truck, along one side, with the access cover 12 facing outwardly, i.e. away from a side of the vehicle. When such a position is provided, a service provider can stand next to the side of the vehicle, adjacent the access cover 12, and service the air cleaner assembly 1.

When located at such a position, the clean air outlet indicated generally at 7, would typically not readily be viewable by the service provider standing next the access cover 12, especially when housing 2 is relatively large. Indeed, as shown by FIG. 1, the outlet conduit 7 would be out of easy view in such an environment.

In some instances, at the outlet conduit, there is provided equipment such as restriction indicator that needs, occasionally, to be monitored. If the conduit 7 is out of easy view, a typical restriction indicator when located adjacent conduit 7, could be out of easy view as well. An example such restriction indicator and placement of such a restriction indicator are shown, for example, in FIG. 13 of WO 2008/045326.

Figure 13:
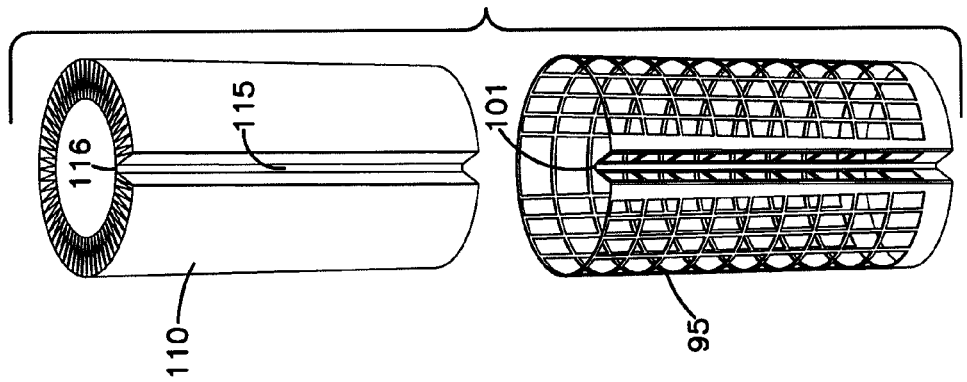
FIG. 13 is a schematic depiction of a step of initially inserting the media of FIG. 12 into an outer liner according to FIG. 10.

To provide for convenient viewing of such equipment as a restriction indicator, the air cleaner assembly 1 includes some selected modifications from arrangements such as depicted in FIG. 13 of WO 2008/045326. In particular, the housing 2 includes a utility conduit 25 therein, extending along an exterior 10x of a sidewall 10 as (of the body 10) generally in a direction between opposite ends 10a, 11 thereof. Typically, the trough 25t will extend completely between the ends 10a, 11. The utility conduit 25 comprises a depression or trough 25t in the sidewall 10x, which provides a receiver for utility equipment discussed below. In general, the conduit 25 allows for communication therealong of a utility member such as a cord, cable, line or tube (i.e. a communication line) preferably without increasing substantially an outer profile of the housing 10. Thus, typically trough 25t is sufficiently deep so that a cord, cable, line or tube that passes therethrough, will be completely recessed or nearly completely recessed therein, relative to immediately adjacent outer portion 10y of housing sidewall 10x. A typical trough 25t would be at least 0.5 cm deep, typically at least 1 cm deep. The conduit 25 then, provides a route for communication of a line, tube, etc, from end 10a toward end 11, to facilitate access by a service provider. The particular equipment in trough 25t, depicted in FIG. 1, is discussed further below and comprises equipment for a restriction indicator.

The conduit recess or trough 25t is convenient, since, by not raising the profile of body 10: space constraints are managed; the conduit or lines is secure; and, if a band is extended around the housing body 10 during mounting, pressure from the band will not damage (for example pinch off) a communication line if fully recessed in the trough 25t. In addition, shipping and assembly are facilitated, since equipment can be pre-positioned in trough 25t by a manufacturer of assembly 1, with the equipment: received in the trough 25t and protected during handling and shipping; and, conveniently positioned for installation of assembly 1.

For the particular assembly 1 depicted, within trough 25t is positioned a restriction indicator arrangement 30, comprising a communication line 31 and a visual reference portion 32.

Restriction indicator arrangement 30 generally is provided to monitor a pressure condition within the air cleaner assembly 1 of the outlet 7 on the downstream side of the filter cartridge relative to the environment. The visual reference portion 32 is typically a color indicator or other visual indicator that will visually indicate whether a restriction limit or condition has been reached. Line 31 generally provides for communication between the visual reference portion 32 and a tap 36, FIG. 2, located at or near the outlet tube 7. Restriction indicators of various types are widely known and have been used in air cleaner assemblies for some time. Conventional indicators can be adapted for use with the principles and features described herein.

Figure 2:
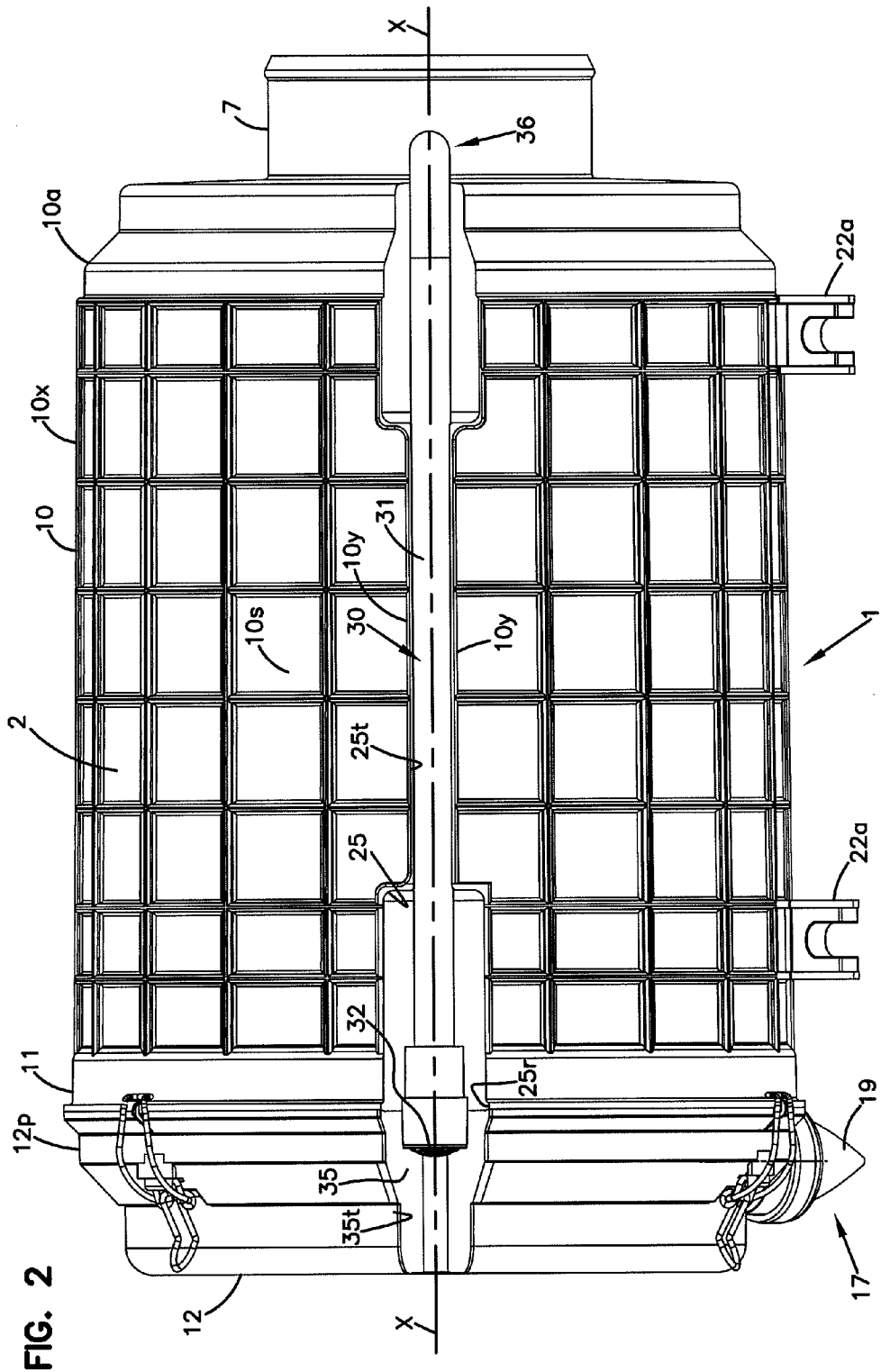
FIG. 2 is a schematic side elevational view of the assembly of FIG. 1, taken generally directed toward a utility conduit therein.

The particular restriction indicator arrangement 30 depicted, is positioned so that the indicator 32 is viewable by an equipment operator or service provider standing adjacent the access cover 12, even though a tap 36, FIG. 2, for a restriction indicator, is at the outlet 7, i.e. at an opposite end 10a of the air cleaner housing 2 and out of view. Further, the visual indicator 32 is recessed within an end portion 25e of trough 25t (i.e. in receiver 25r in housing 2) where it is protected from damage during handling and use.

Still referring to FIG. 1, it is noted that access cover 12 includes recess 35 therein which forms an exterior recess or conduit 35t therethrough, so that the access cover 12 does not cover (block, i.e. from view) visual reference portion 32 when installed, to accommodate viewing access to the visual reference portion 32. The recess 35t is usually at least 2 cm wide, at its widest, and at least 2 cm deep (in radial direction inwardly from periphery 12p).

In general terms, according to an aspect of the present disclosure, an air cleaner assembly is provided which includes, in a housing 2 thereof, a utility conduit 25 extending in a direction between opposite ends of a sidewall 10s and comprising a recess 25t in an outer wall 10x of a body 10. Typically the conduit 25 extends along a complete length of an outer sidewall 10 of the air cleaner housing 10 between opposite ends 11, 10a. This conduit 25 allows for receipt therein of a utility equipment such as a tube, line, etc, to accommodate various equipment such as for example, a restriction indicator arrangement 30. Also, the example air cleaner assembly 1 depicted includes an access cover 12 configured to accommodate viewing of a restriction indicator or other utility equipment, recessed within the conduit 25, without a need to remove the access cover 12. In the example provided, this comprises a perimeter recess 35 in an outer perimeter 12p of the access cover 12. (It is noted that in the example essentially, the restriction indicator at least partially projects into the perimeter recess 35 in the access cover).

Another issue presented by air cleaners such as air cleaner assembly 1 relates to the air cleaner assembly 1 often being positioned where it is subject to substantial vibration and/or shock during use. Internally received within the air cleaner assembly 1, as described above, will typically be a serviceable main filter cartridge. Such filter cartridges are generally removable components, and are serviced by opening access cover 12. In many instances, the filter main air cartridge is removably sealed to a portion of the air cleaner assembly 1 through a radial seal, either inwardly or outwardly directed. Examples of such seals are shown and described for example in WO 2009/014986; WO 2009/014988; U.S. Pat. No. 7,070,642; U.S. Pat. No. 5,547,480; U.S. Pat. No. 5,693,109; U.S. Pat. No. 6,039,778; U.S. Pat. No. 6,955,701; U.S. Pat. No. 6,652,614; WO 2009/014982; and, WO 2006/026241, each of which is incorporated herein by reference. Because such seals are radial, unless the cartridges are in some fashion secured against rotation, the cartridge can rotate under vibration and shock conditions.

In can be desirable in some instances to provide the filter cartridge with an arrangement inhibiting undesirable levels of rotation under vibration/shock circumstances. It will be understood from further descriptions below, that a preferred such arrangement is provided herein. Indeed, it is provided in a fashion can also accommodate the features characterized above, when present.

Attention is now directed to FIG. 2. FIG. 2 is a schematic plan view of the air cleaner assembly 1, taken generally toward the conduit 25. In FIG. 2, the clean air outlet 7 from the housing 2 is viewable, at an opposite end of the housing 2 from the access cover 12. Also viewable is the location of tap 36 in conduit 7, in communication with which the line 31 of the restriction indicator arrangement 30 is provided, extending between tap 36 and visual portion 32. In FIG. 2, one can see that for the example assembly 1 depicted, the visual portion 32 does project partially into recess 35 in the perimeter 12p of access cover 12. It is noted that recess 35 is closed, i.e. it forms a portion of perimeter 12p and is not open to an interior of the housing 10.

Figure 3:
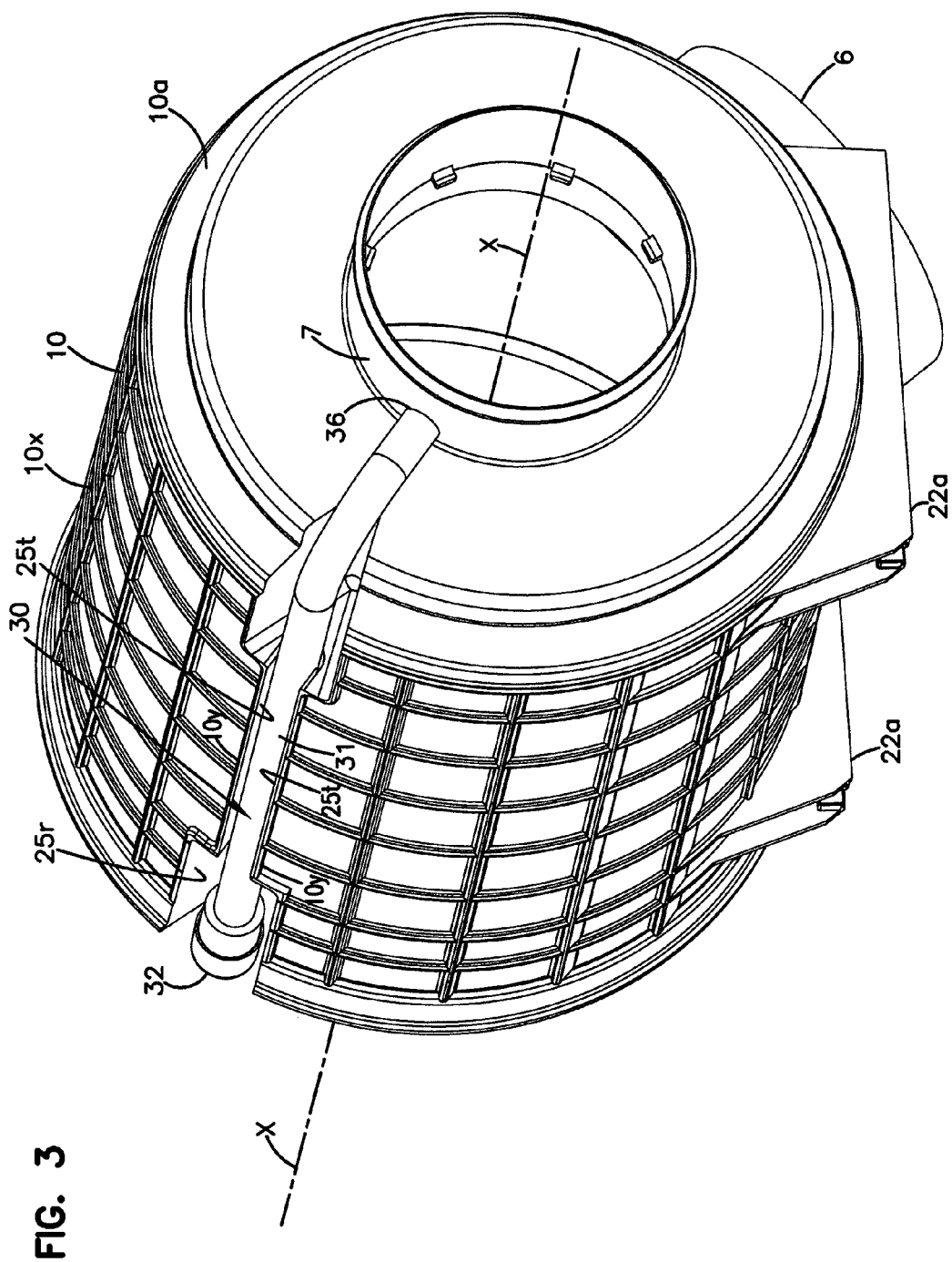
FIG. 3 is a schematic outlet end perspective view of the assembly of FIG. 1.

Referring to FIG. 3, it will be understood that a prior art restriction indicator, for example of the type depicted in FIG. 13 of WO 2008/045326, if associated with tap 36, would be out of view of the service provider adjacent access cover 12, FIG. 1. Further, if it were mounted to extend toward the service provider, without being received within a trough such as trough 25, it would be exposed to potential damage during handling, shipping, installation, and/or use.

In FIG. 3, a perspective view of the air cleaner assembly 1 is depicted, except for access cover 12 being removed and any internally received filter cartridge being removed. In FIG. 3, the location of tap 36 in conduit 7 can be readily inspected. Also, some features of inlet arrangement 6 can be inspected.

Figure 4:
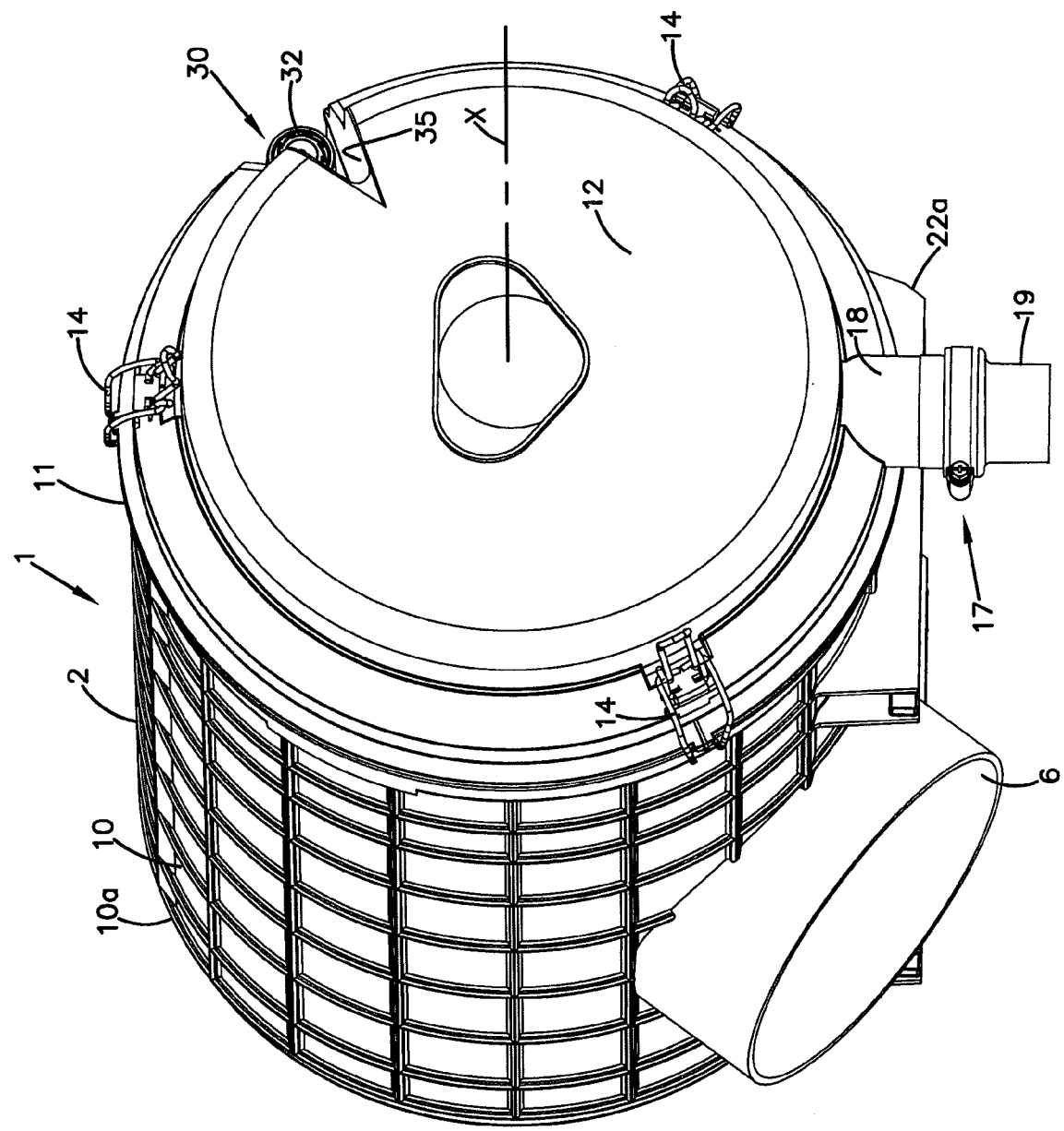
FIG. 4 is a schematic alternate access end perspective view of the assembly of FIG. 1; the view of FIG. 4 being taken generally, partially, toward a bottom portion.

In FIG. 4, a second perspective view of the air cleaner assembly 1, somewhat analogous to FIG. 1, is provided, except the view being from an orientation generally beneath the air cleaner assembly, and showing features on an opposite side from conduit 25.

It is noted that the particular inlet arrangement 6 depicted in FIG. 4, is generally a "radial" inlet, i.e. a center line of the inlet arrangement 6 would be directed generally toward a central longitudinal axis X of the air cleaner housing 2. As will be understood from a second described herein below, certain techniques according to the present disclosure can also be implemented with arrangements in which the inlet arrangement is directed tangentially, for example as part of a pre-cleaner stage.

Figure 5:
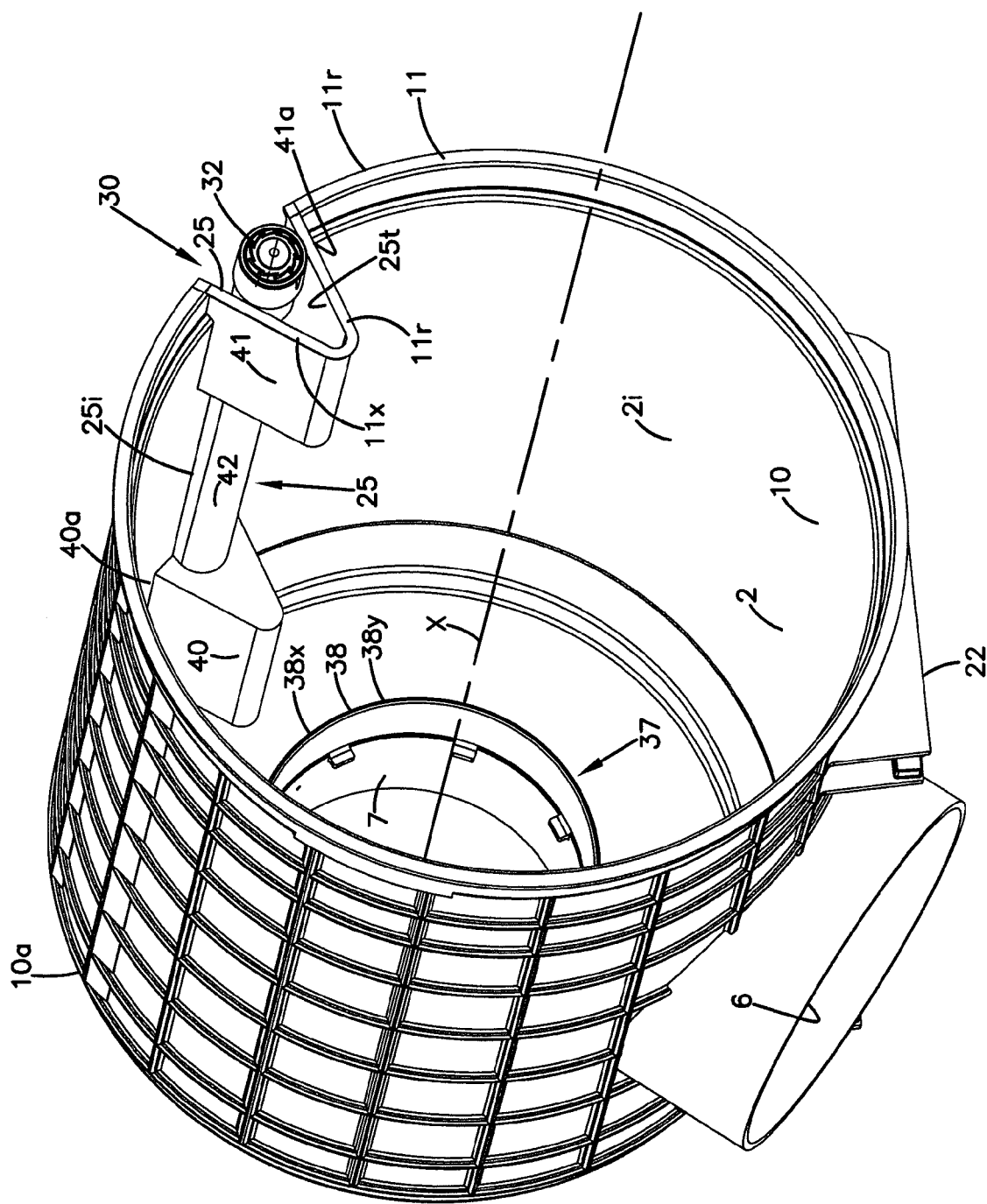
FIG. 5 is a schematic perspective view analogous to FIG. 4, but depicting the assembly with an access cover removed and with a filter cartridge removed.

In FIG. 5, a view generally analogous to FIG. 4 is provided, but with access cover 12 removed and an internally received filter cartridge removed. Referring to FIG. 5, selected internal features of the example depicted air cleaner assembly 1 can be seen.

Referring to FIG. 5, at 37, a seal end of air cleaner housing 2 is generally viewable. Herein, the term "seal end" in this context is meant to refer to an end region of the housing 2 against which an internally received main filter cartridge will form a removable seal. The seal end 37 will generally include a seal surface specifically positioned and configured for sealing of a removable filter cartridge thereagainst.

Referring to FIG. 5, in the particular example air cleaner assembly 1 depicted, at the seal end 37 is provided a seal tube 38. Seal tube 38 has an outside surface 38x and an opposite inside surface 38y. Each is generally radially directed, relative to a central axis of the housing 2.

A main filter cartridge (not depicted in FIG. 5) can be configured, for sealing against one or the other of the surfaces 38x, 38y, when the cartridge is configured with a radial seal. When the cartridge is configured to seal against surface 38x it will generally be referred to as a cartridge having an inwardly directed radial seal. When configured to seal against surface 38y, the cartridge will sometimes be characterized as having an outwardly directed radial seal. It is noted that in some instances, a main filter cartridge can be configured to seal against surface 38x with an internally received safety cartridge configured to seal against surface 38y.

It is also noted that alternative seal surfaces to those depicted in the example of FIG. 5 are possible. For example, some main filter cartridges are configured with an outer perimeter seal, around an end of the media, which is pushed into a surrounding portion of the housing, to form a seal. Typically, preferred arrangements according to the present disclosure which also include a conduit 25 do not use such outer perimeter seals, since internal features of the conduit 25 would tend to interfere. However, the housing could be configured to accommodate such a seal with application of some principles according to the present disclosure.

Still referring to FIG. 5, attention is directed to utility conduit 25, and in particular to features of utility conduit 25 positioned within interior 2i of housing 2. Specifically, in FIG. 5, interior portion 25i of conduit 25 is viewable. The example conduit interior 25i includes: a first end portion 40; an opposite, second, end portion 41; and central portion 42 extending between portions 40 and 41.

Section 40 typically projects radially inwardly from adjacent portions 40a of sidewall 10 an amount corresponding to at least 3 cm and often at least 6 cm. Region 40 is typically positioned adjacent to end 10a. Region 41 also typically projects radially inwardly a distance of at least 3 cm, and often at least 6 cm, from an adjacent portion 41a of sidewall 10. Region 41 is typically positioned adjacent end 11.

Central section 42, in a typical arrangement, does not project radially inwardly as far as to end regions 40, 41. For the example depicted, region 42 projects radially inwardly no more than 60% as far as each of ends 40, 41, and typically no more than 40% as far as regions 40, 41, although alternatives are possible. A typical amount of interior projection for region 42 would be no more than 5 cm, typically no more than 3 cm and usually at least 0.5 cm and typically at least 1 cm, although alternatives are possible.

Typically, interior 25i of conduit 25 is closed. That is, air and water flow cannot enter interior 2i of housing 2 through the conduit 25 along its interior 25i.

Regions 40, 41 are typically sized and configured to overlap and engage selected portions of an interiorly received cartridge in a manner such that the cartridge cannot rotate an undesirable amount, due to potential radial interference, for example with regions 40, 41. Portions of a interiorly received cartridge that provide for this interference would be understood from discussions herein below, in reference to FIGS. 6-16.

Attention is now directed back to FIG. 1 and in particular to access cover 12. Access cover 12 includes an outer perimeter 12p which is generally circular, except in the region of recess 35. At recess 35 a radially inner projection is defined provided by wall section 35w. In this manner the access cover is sized to fit over end 11, FIG. 5, with recess 35 providing an extension to trough 25. The access cover 12 or body 10 can be provided, if desired, with seal member appropriate to provide a weather seal, for example in engagement with rim 11r, FIG. 5, and recess 11x therein.

Figure 6:
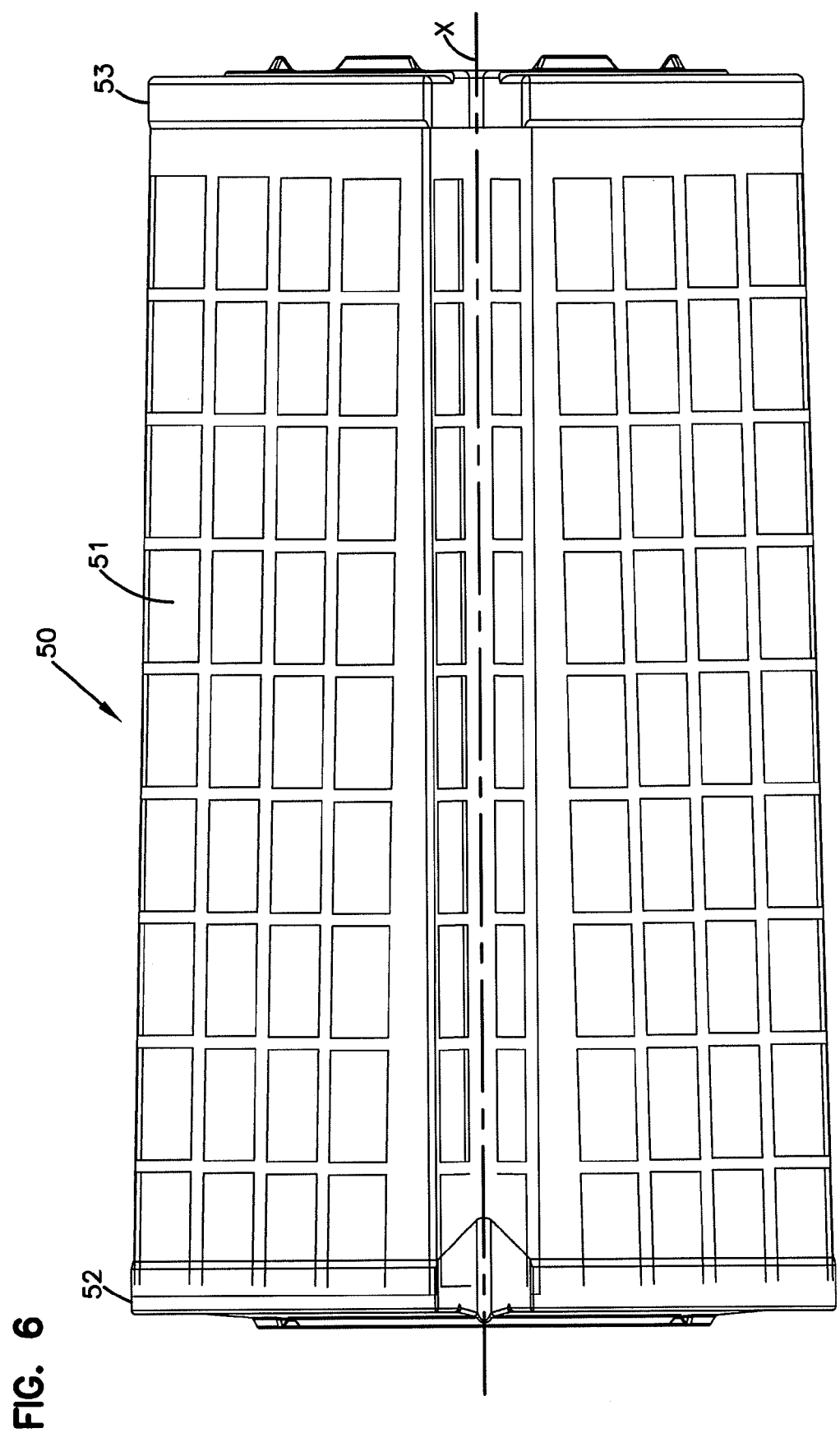
FIG. 6 is a schematic side elevational view of a filter cartridge usable in the assembly of FIGS. 1-5.

Attention is now directed to FIG. 6, in which a cartridge 50 configured for use in air cleaner assembly 1, FIGS. 1-5 is depicted. The cartridge 50 depicted, comprises a media pack 51 positioned in extension between first and second, opposite, end caps or pieces 52, 53. End piece or end cap 52 is configured to be inserted into housing 2, FIG. 5, directed toward seal end 37. End piece or end cap 53 is generally configured and sized so that when cartridge 50 is positioned within housing 2, FIG. 5, end piece 53 is directed toward and access cover 12 (FIG. 1).

Figure 8:
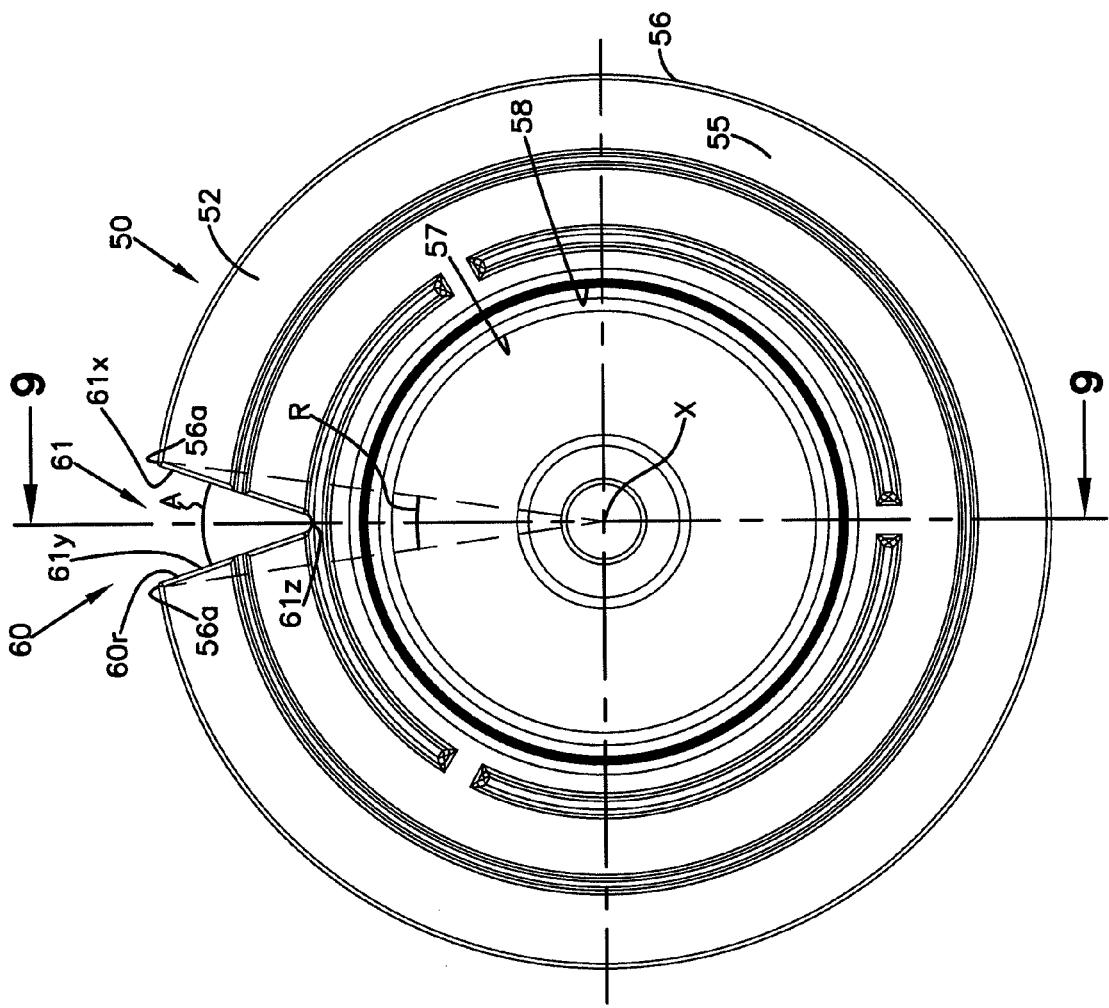
FIG. 8 is a schematic open end plan view of the filter cartridge of FIGS. 6 and 7.

In FIG. 8, an end view of cartridge 50, taken generally toward end cap 52 is provided. Typically, the end cap 52 will be molded-in-place, although alternatives are possible. In a typical system, end cap 52 will be molded from a material such a polyurethane, for example a soft, foamed, polyurethane. A typical polyurethane would be one having: an as molded density of no greater than 28 lbs/cu·ft (450 kg/m$^3$) typically no greater than 22 lbs/cu·ft. (355 kg/m$^3$) and often within the range of 13-17 lbs/cu·ft (208-275 kg/m$^3$) and, a hardness, Shore A, of no greater than 30, typically no greater than 22; and, often within the range of 10-20. Such urethanes are well known and widely used in filter cartridge manufacture. Urethanes of the types described in WO 2006/026241, incorporated herein by reference, for example, can be used.

Referring to FIG. 8, end cap 52 for the example depicted, has an outer surface 55 sometimes referred to as an outside axial surface, which is a surface of end cap 52 facing opposite media pack 51, FIG. 6. End cap 52 defines an outer perimeter 56. Further, the end cap 52 surrounds and defines a central air flow aperture 57.

In general, the aperture 57 comprises an air flow aperture through which air from open filter interior 51i, for example surrounded by the media pack 51, can flow. For example, aperture 57 will, in a typical application, be a clean air exit for filtered air from the cartridge 51 to then pass through outlet tube 7. In the example cartridge 50, aperture 57 is in part defined by (i.e. is surrounded by) seal surface 58, which comprises a potion of the end cap 52 configured to fit around and seal against surface 38x, FIG. 5.

Still referring to FIG. 8, it is noted that along outer periphery 56, end cap 52 includes a peripheral conduit recess arrangement 60. The conduit recess arrangement 60 comprises one or more recesses 60r, in perimeter 56, sized and shaped to receive conduit 25 passing therethrough, when cartridge 50 is installed. The example end cap 52 depicted, includes a single conduit recess 60r. However, it could be configured with more than one conduit recess. The single conduit recess 60r of conduit recess arrangement 60 is indicated generally at 61.

It is noted that the example conduit recess 60 can be characterized as extending completely axially through end cap 52. By the term "axially" in this context, to reference is meant the general direction of central axis X, FIGS. 6 and 7. Similarly, the example aperture 57 can be characterized as extending completely axially through end cap 52. Of course in a typical embodiment, the specific recess 61, and central aperture 57, depicted are actually voids around which end cap 52 is molded.

Conduit recesses in the conduit recess arrangement 60 can have a variety of shapes. Typically, the shape should be sufficiently large so that the cartridge 50 can be installed within the housing 10 appropriately and without undesirable interference from the conduit 25. In a typical assembly, this will be a conduit recess 61 in which at least the radial inward extension of the conduit recess. For the example recess 61, extension radially inwardly from adjacent outermost portions 56a of perimeter 56 is at least 30% of a distance across end surface 52 (toward aperture 57) typically at least 50% of such a distance, usually at least 70% of such a distance and often at least 80% of that distance. The distance of extension can also be characterized with respect to a distance between a media outer perimeter and media inner perimeter, analogously, since the outer perimeter of the media is typically adjacent the outermost portion of the end cap perimeter. Thus, typically the recess 61 extends inwardly from adjacent the outermost portion of the media, a distance of at least 30%, usually at least 50% and often at least 70% and in some instances at least 80% of a distance from the media outer perimeter toward the media inner perimeter. Thus, recess 61 typically projects, radially, inwardly between adjacent pleats, when the media is pleated, or otherwise between media sections.

In a typical assembly, the radial inward extension of recess 61 will comprise at least 5%, typically at least 10% and often at least 20% of a distance from immediately adjacent outer most portions 56a of perimeter 56 toward a center or central axis X of the cartridge 50.

Typically, adjacent outer edge 56, each conduit recess 61 will be open over a radial arc R, FIG. 8, relative to center axis X, of at least 5°, typically at least 10°, usually at least 12°, and often within the range of 10°-25°. This will be sufficiently large, to allow for ease of installation over a typical, example, conduit 25. Thus, typically arc R is no greater than 50°. Usually arc R is within the range of 5°-50°, inclusive, often 10°-40°, inclusive.

The particular shape of the conduit recess 61 through end cap 52 is not critical, with respect to the issue of clearing conduit 25, FIG. 5 during installation. A typical, convenient, recess shape for each recess 60r, indicated in FIG. 8, is one of V-shape, comprising two sides 61x, 61y projecting radially outwardly from a central radially inner vertex, 61z. Typically the sides 61x, 61y extend, relative to the vertex 61z, at angle A of at least 15°, usually not more than 80°, and often within the range of 20°-70°, inclusive. However, alternate shapes are possible. In this context, when reference is made to the two sides 61x, 61y, reference is meant to a "V" shape view in plan or elevational view analogous to FIG. 8, or cross-section. Further, reference to the "vertex" 61z, is not meant to necessarily reference a sharp vertex, rather it may be a conveniently rounded vertex as described and shown.

Preferably the conduit recess 61 is sized so that while it will clear the conduit 25, when installed, in the vicinity of inner conduit section 40, the cartridge 50 cannot rotate substantially, without interference between end cap 52 and region 40, FIG. 5. Thus, typically, the recess 61 is sized relative to conduit end 40 in the region of projection, so as to not allow rotational movement of the cartridge 50 over a total arc (extension of movement from one extreme to another) of more than about 25°, and typically not more than 15°. Indeed, in some instances a very close tolerance that does not provide for much possible rotational movement at all will be preferred.

Figure 7:
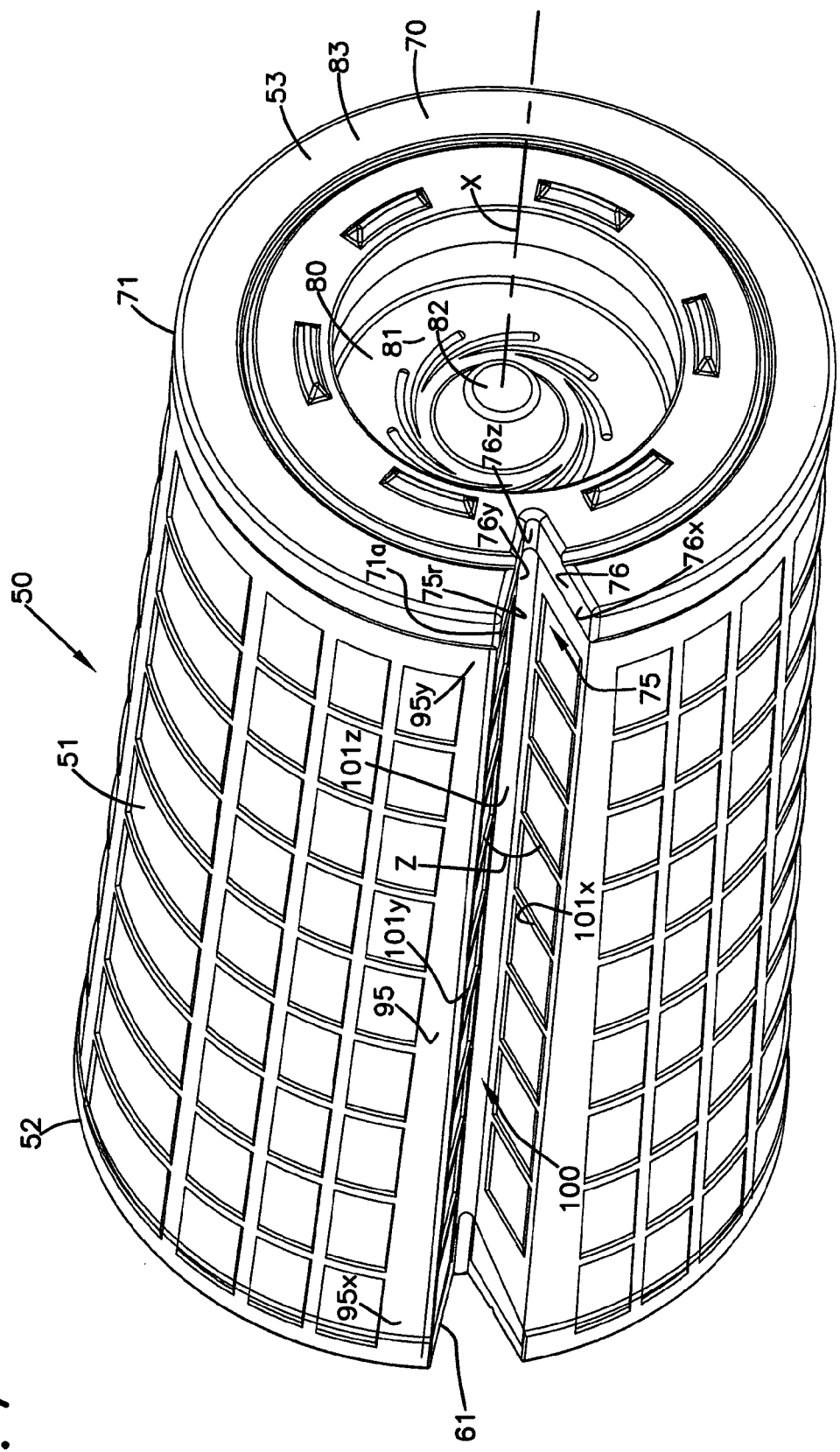
FIG. 7 is a schematic closed end perspective view of the filter cartridge of FIG. 6.

Attention is now directed to FIG. 7, in which a perspective view of cartridge 50 is provided. In FIG. 7, end cap or end piece 53 is viewable. The end piece 53 includes an outer surface 70, analogously to surface 55 comprising an end axial surface of end piece 53, generally directed in a direction opposite media pack 51. End piece 53 also includes an outer perimeter 71, analogous to perimeter 56 of end cap 52. The perimeter 71 includes a recess arrangement 75 therein, which comprises one or more recesses 75r. The particular recess arrangement 75 depicted comprises a single conduit recess 76.

Relative to other portions of the end cap 53, conduit recess 76 can be sized and shaped generally analogously to recess 61, if desired. For the particular cartridge 50 depicted, it is noted that end cap 53 has a somewhat smaller outer diameter or dimension than end cap 52. Of course, this can be accounted for, in determining the size and shape of conduit recess 76. Also, it is noted that during installation conduit recess 76 does not need to clear portion 40 of conduit 25, FIG. 5, but rather only needs to clear portion 41.

Of course variations in the shape and size of conduit recess 76 are possible. The particular recess 76 depicted comprises first and second radially outwardly extending sides 76x, 76y extending radially outwardly from a central vertex 76z. Generally, an angle of extension in the sides 76x, 76y for the vertex 76z will be analogous to angle A, discussed above, i.e. typically at least 15°, usually not more than 80°, and often within the range of 20°-70°, inclusive. Also, typically an arcuate extension relative to immediately adjacent portion of outer perimeter 71 is analogous to arc R, discussed above, of at least 5°, typically at least 10°, and usually at least 12°, preferably no greater than 50°, typically within the range of 5°-50°, inclusive, and often within the range of 10°-40°, inclusive. Typically a total extent of inner projection of recess 76 from immediately portions 71a of perimeter 71 is at least 5%, typically at least 10% and often at least 15% (and sometimes 20% or more) of a distance from immediately adjacent outermost portions 71a, of perimeter 71 toward a center of central axis X of the cartridge 50.

Typically, recess 76 extends radially inwardly a distance of at least 0.5 cm, often at least 0.75 cm and in some instances 1 cm or more.

It is noted, referring to FIG. 7, that recess 76 for the example depicted, is radially positioned around axis X, to provide for axial alignment with recess 61. This would be typical and preferred, as it accommodates a straight conduit 25, although alternatives are possible.

Referring to FIGS. 6-8, it is noted that each of the end caps 52, 53 is depicted with only one recess 61, 76 therein. This will be typical, however, alternatives are possible. Preferably to provide for strength and integrity, and convenient assembly, typically each end cap 52, 53 (and an outer surface thereof (55, 70, respectively)) has a portion adjacent an outer perimeter thereof (56 and 71, respectively) with no recess therein that extends in overlap between pleats, for example of deeper than about 0.5 cm, over one or more radial extensions or arcs of at least 80°, typically at least 160° and often at least 270°, around central axis X. Of course, minor recesses in outer perimeters 56, 71, that do not extend in overlap between media pleats will be typical in arrangements from mold centering stand-offs used during molding. Such minor recesses would typically be substantially less than 0.5 cm deep, in radial extension, usually no more than 3 mm and typically less.

Still referring to FIG. 7, it is noted that the particular end cap 70 depicted, is a closed end cap, and i.e. has no opening therethrough in communication with an open filter interior. The end cap 70 depicted, includes a central recess 80 having a closed end 81 extending thereacross, with an axially outwardly directed central projection 82. Typically, with such an arrangement, end piece or end cap 70 is a composite construction, with an outer ring 83 that is molded-in-place over an end of a media pack, for example from a polyurethane analogous to that used for end cap 52. Center region 80 is typically formed from a preform, for example as a preformed rigid molded plastic piece that is part of an inner liner secured in place by ring 83.

Figure 9:
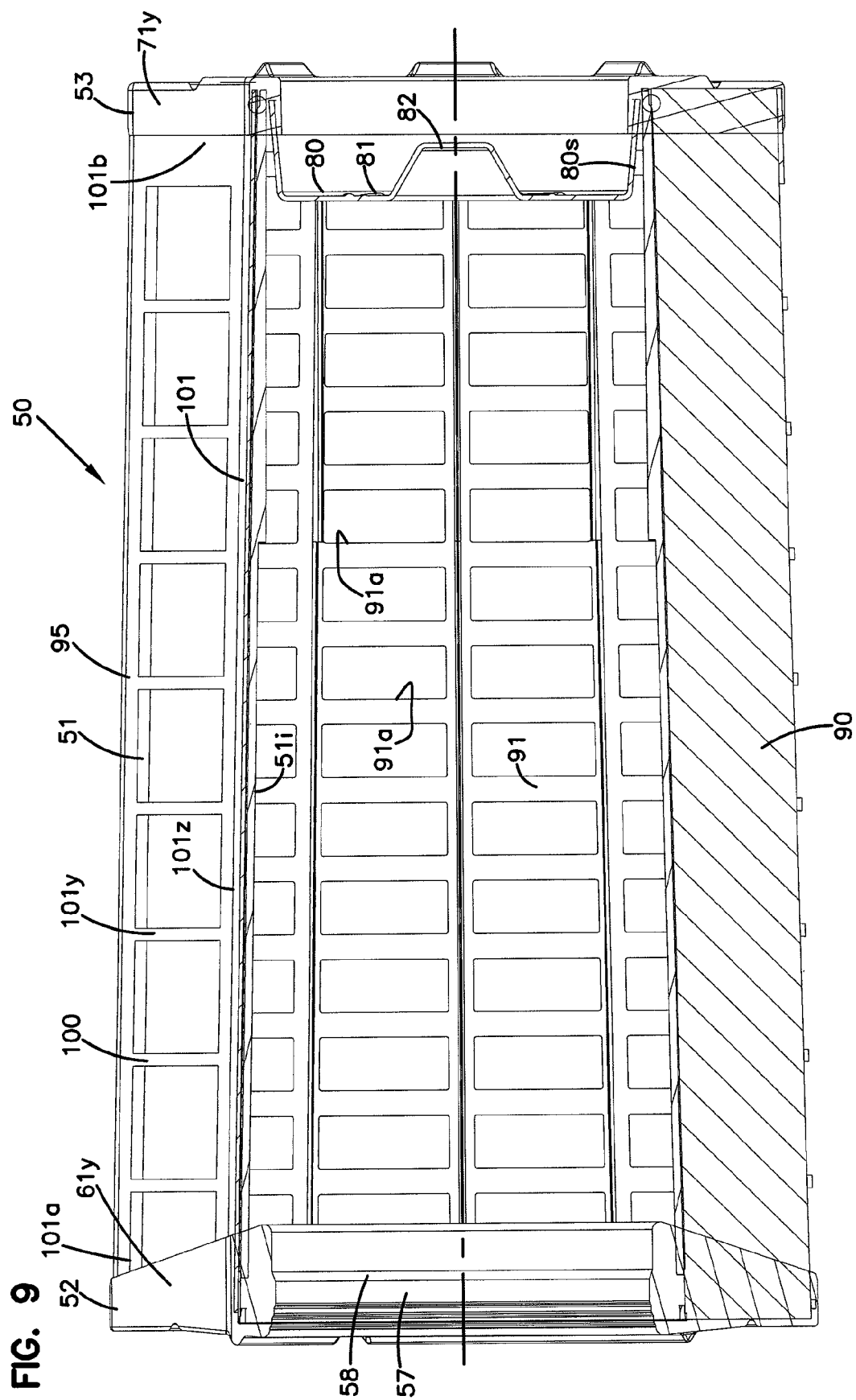
FIG. 9 is a schematic cross-sectional view of the filter cartridge of FIGS. 6-8, taken along line 9-9, FIG. 8.

Attention is directed to FIG. 9, in which a cross-sectional view of the cartridge 50 is provided.

Again, media pack 51 extends between end pieces 52, 53. The media pack 51 is configured to surround and define an open filter interior 51$i$. The media pack 51, in general, comprises media 90, in the example depicted also configured to extend around an open filter interior 51$i$. The media 90 can comprise a variety of materials configured in a variety of forms. Typically, the media 90 will comprise pleated media folded in a zigzag pattern with alternating interiorly directed and exteriorly directed pleats extending generally between the end pieces 52, 53, typically embedded in molded-in-place portions of the end pieces 52, 53 for sealing.

The media 90 will typically be positioned with an end surrounding a sidewall 80$s$ of recess 80, FIG. 9. The media pack 51 may be provided with an inner liner 91 extending between end pieces 52, 53. Such inner liners are common for filter cartridges, and typically comprise either expanded metal, perforated metal, or plastic frame pieces. The example liner 91 depicted comprises a plastic frame piece, having apertures 91$a$ therein.

Referring still to FIG. 9 the particular media pack 51 depicted, includes an outer liner 95. The outer liner 95 generally is perforate, i.e. configured to allow air flow therethrough. The outer liner 95 is positioned and oriented to extend between end pieces 52, 53. Example outer liners can be metal pieces, such as an expanded metal or perforate metal piece if desired. The particular outer liner 95 depicted comprises a plastic piece, for example an injection molded plastic piece. Such a piece is depicted, for example in FIG. 10.

Referring to FIGS. 6-9, it is noted that the example media pack 51 depicted includes a recess 100 therein, in the example depicted comprising a conduit in continuous extension between end pieces 52, 53 and in axial alignment with selected portions of recess arrangement 60, 75. The media pack recess 100 is a recess in the media pack 51 of sufficient size to clear conduit 25, during installation. The media pack recess 100 includes a radially recessed portion 101 in liner 95, FIG. 9, with opposite ends 101$a$, 101$b$, sized and positioned to engage and overlap with recesses 61, 76, respectively. Typically, adjacent at least one end cap 52, 53 (and typically both) recess 100 is positioned to extend at least 1.5 cm axially, and is sized to receive a portion of the same projection as extends into the adjacent end piece recess.

Referring to FIG. 9, the particular media pack recess 100 depicted, comprises a V-shaped recess having first and second sides 101$x$, 101$y$ (see FIG. 7) extending radially outwardly from a central radially inner, vertex 101$z$, and extending generally along liner 95 between opposite liner ends 95$x$, 95$y$.

Such a V-shaped recess will be convenient when used in the media pack 51 comprising pleated media, since the media can be spread around v-shaped conduit recess 100 by spreading two adjacent pleats apart along their outer pleat tips. Typically, V-shaped conduit recess 100 will have an internal V-angle, indicated generally at Z, FIG. 7, of at least 5° and not greater than 80°, typically within in the range of 20°-70°, inclusive. A similar definition is provided between adjacent pleats, in media adjacent recess 100.

Figure 10:
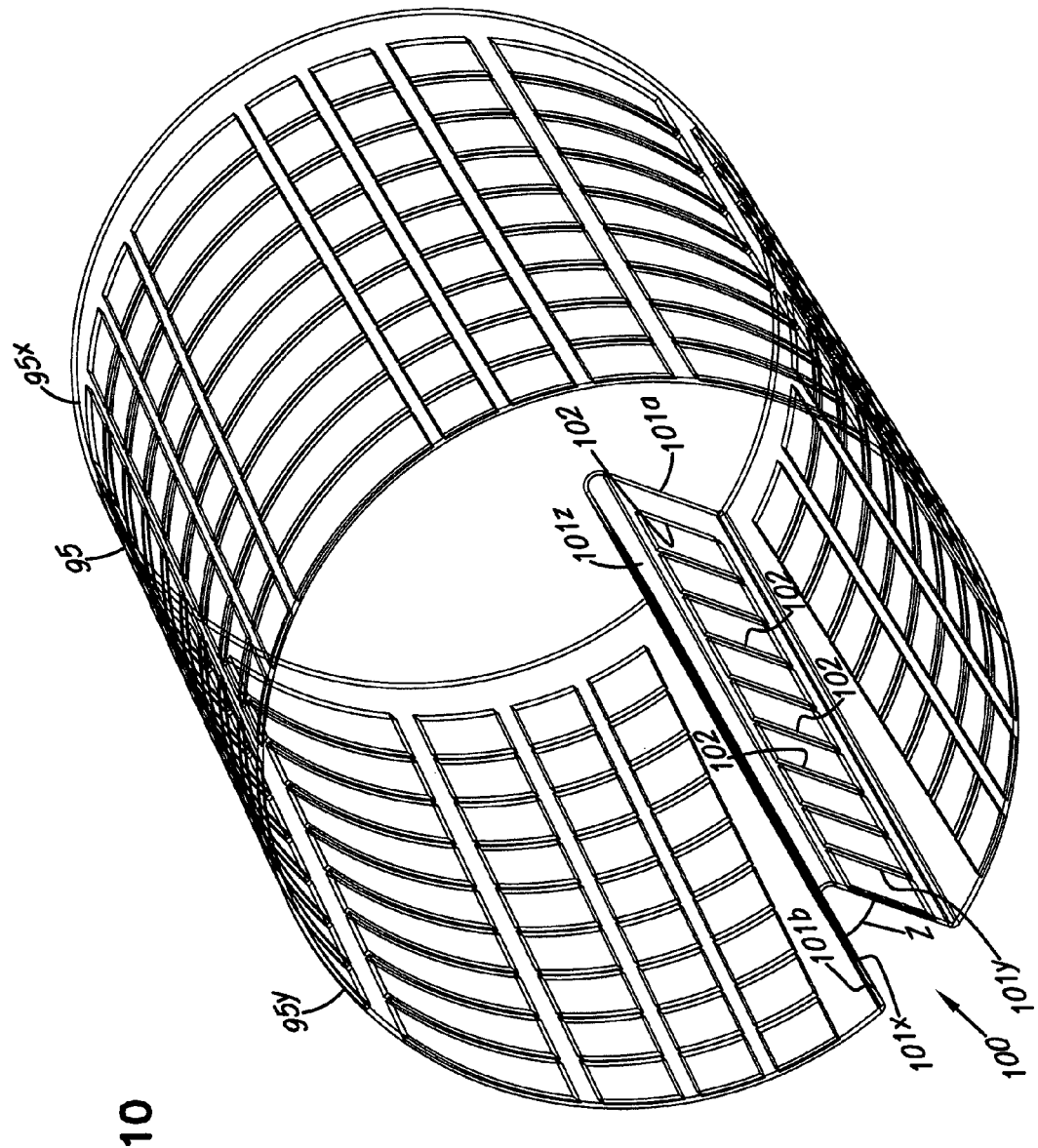
FIG. 10 is a schematic perspective view of an outer liner component usable in the filter cartridge of FIGS. 6-9.

Referring to FIG. 10, it is noted that in sides 101$x$, 101$y$, liner recess 100 is perforate, i.e. includes apertures 102. While this is optional, it provides for a convenient, efficient, use of media surfaces pressed against sides 101$x$, 101$y$ when pleated media is used. Of course other portions of liner 95 are also perforate.

Figure 11:
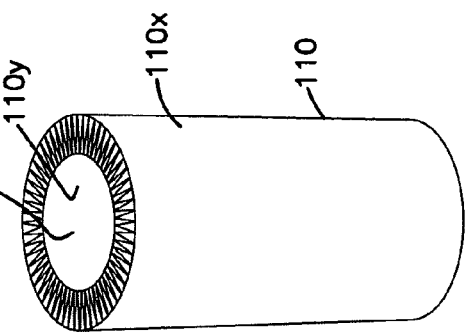
FIG. 11 is a schematic perspective view of a filter media component of the filter cartridge of FIGS. 6-10.

From a review of FIGS. 11-16, a convenient approach to assembly of a cartridge 50 can be understood. Referring first to FIG. 11, a pleated media construction is depicted schematically at 110 surrounding interior 111. It is noted that the media pack 110 is depicted schematically and around its outer and inner periphery 110$x$, 110$y$ respectively, individual pleats are not drawn. Thus, in FIG. 11, a general peripheral shape to media 110 is shown by the drawing, which is generally cylindrical.

Figure 12:
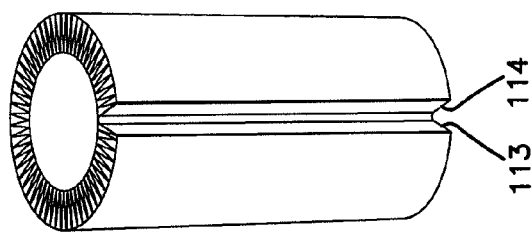
FIG. 12 is a schematic perspective depiction of the media component of FIG. 11, shown with a media pack recess formed therein.

The pleat depth generally corresponds to a distance between outer periphery 110$x$ and inner periphery 110$y$. Typically, the media 110 will have been formed as a pleated panel, which is then coiled, with opposite pleated media pack ends secured (sealed) to one another, to form a configuration of FIG. 11. In FIG. 12, two selected outer pleats indicated generally at 113, 114 are shown spread apart to form recess 115. Of course recess 115 comprises an inwardly facing pleat. In FIG. 13, media 110 with recess 115 therein is shown pushed into liner 95. The insertion is at end 120 which is the larger of the two ends 120, 121, with the liner 95 oriented so that recess 101 projects radially into recess 115. Since, along the inner region 116, media extends across recess 115, no break or leak in the media 110 is provided.

Figure 14:
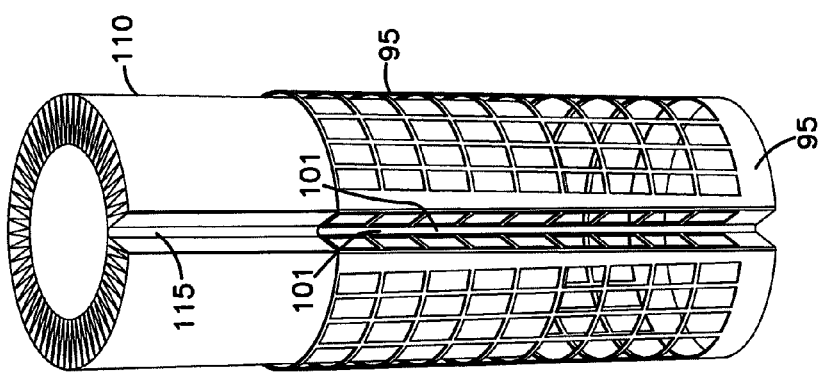
FIG. 14 is a perspective view showing partial insertion of the media of FIG. 12 into the liner of FIG. 10.

In FIG. 14, partial insertion of the media pack 110 and the liner 95 is shown.

Figure 16:
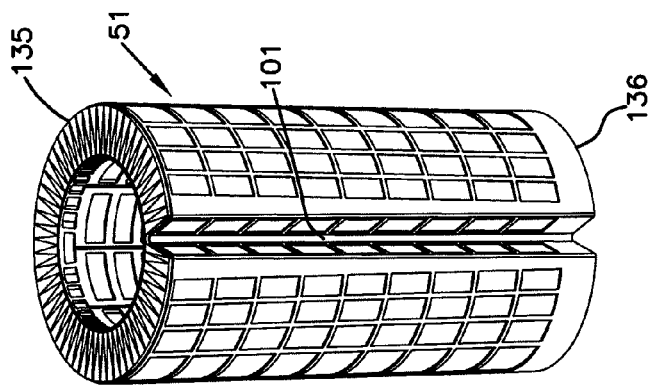
FIG. 16 is a schematic perspective view of a combination of inner liner/media/outer liner, resulting from the step of insertion of FIG. 15.
Figure 15:
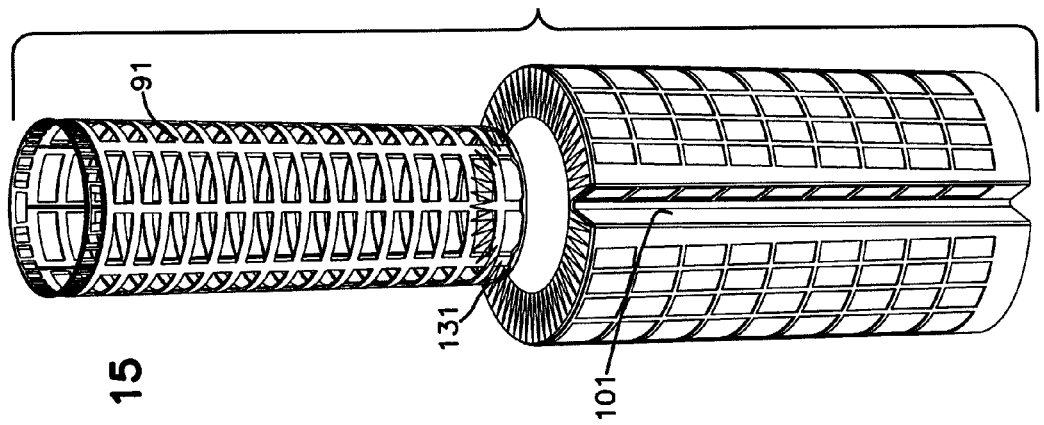
FIG. 15 is a schematic depiction of a step of inserting an inner liner into a resulting media/outer liner combination from the step of FIG. 14.

In FIG. 15, a follow-up step of inserting inner liner 91 is provided. It is noted that closed end portion 81, FIG. 9 would be included in end 131 of liner 91. Closed end 91, with projection 82, FIG. 9, could for example, be molded integral with other portions of liner 91. In FIG. 16, the resulting media pack 51 is depicted. At end 135, end cap 52 would typically be formed, by molding. At end 136 outer rim portion 83 of end cap 53 would typically be formed by molding. The molding of end cap 52, 53 will provide sealing at ends of media pleats.

It is noted that although the media pack started with a cylindrical shape, as a result of being formed by the liner 95 and liner 91, it adopts a somewhat conical outer surface definition, in the particular cartridge depicted. A typical conical angle of extension would be at least 0.25°, typically within the range of 0.25°-5°, inclusive. Alternative are possible, including arrangements without a conical angle (i.e. cylindrical).

From the above, general principles of convenient construction, in accord with a convenient approach for assembly, can be understood. In particular, for a convenient assembly involving pleated media packs, conduit 101 will have a v-shape to correspond to a pair of adjacent spread wide or spread apart pleats in the media pack. Thus, the end pieces 52, 53 will generally include recesses 61, 76 therein, corresponding to this v-shape. Also, typically the amount by which the recesses 61, 76 extend from an outer perimeter from the end caps 52, 53 toward an inner region, will correspond to approximately the pleat depth of the media. In fact, the amount of inner projection can be only slightly smaller than the pleat depth to accommodate for an inner pleat tip extending over vertex 101z, and for accounting a the thickness of liner 95 in the region of vertex 101z itself. Thus, recesses 61, 76 can extend radially inwardly an amount corresponding to at least 80% of a pleat depth, and often at least 90% of the pleat depth and often more, when the media is pleated. Also, typically the shape of recesses 61, 76 will be v-shaped in cross-section, to accommodate a convenient assembly as described. Indeed, typically conduit sections 40, 41 will be v-shaped as well, although alternatives are possible.

Referring to FIG. 10, it is noted that the liner 95 includes only one recess 101 therein. Of course, it could be provided with a plurality of recess. However, it would typically have no more recesses that are greater than 0.5 cm in depth, than the number of analogous recesses in the end pieces, for FIG. 14. Typically, the liner 95 will include at least one arcuate peripheral extension of at least 80°, typically at least 160°, and in some instances at least 270°, over which there is no recess greater than 0.5 cm deep therein.

Again, the example cartridge 50 depicted, has a somewhat conical outer perimeter definition, with end cap 52 having a larger outer dimension than end cap 53. That is, liner 95 generally tapers downwardly in extension from end cap 52 to end cap 53. Of course the principles can be implemented with a cylindrical media pack and no taper, if desired. Also, other alternate shapes from conical and/or alternate conical angles are possible.

Referring again to FIGS. 14-16, it is noted that recess 101 and the liner 95 is generally continuous and open in extension between opposite axial ends. This is convenient for assembly and installation. However, in application of some aspects of the present disclosure, the recess 101 could be discontinuous in its extension between opposite axial ends, for example a ridge or frame structure could be provided thereacross, provided such a structure could also be accommodated by housing features during assembly.

II. A Second Example Embodiments

FIGS. 17-36

It is noted that in the example embodiment of FIGS. 1-16, principles of the present disclosure were implemented in an arrangement in which advantages were preferably provided with respect to each of: a housing including of a utility conduit; inhibition of cartridge rotation once installed; and, ensuring that an appropriate cartridge for the air cleaner assembly is installed. The principles according to the present disclosure can be applied in situations in which the housing does not have a utility conduit, while still obtaining some advantage with respect to the other described features. An example assembly in which this is demonstrated, is depicted in FIGS. 17-36. It is also noted that the assembly of FIGS. 17-36, as described below, uses a main cartridge which is cylindrical and does not have a conical outer surface, and is depicted in an environment in which a safety cartridge is also used. Both of these options of course, can be used in the assembly of FIGS. 1-9.

Figure 17:
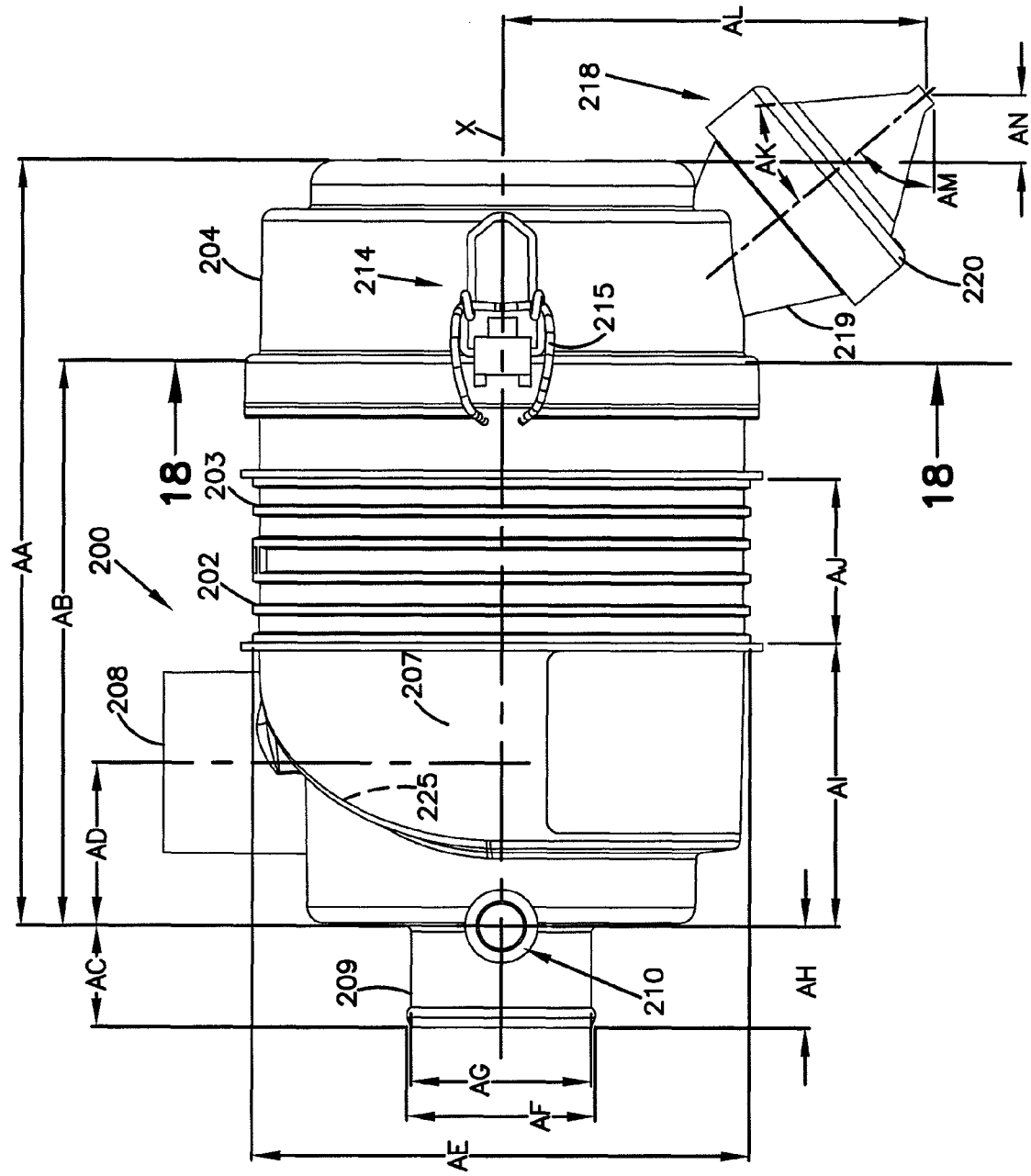
FIG. 17 is a schematic side elevational view of a second embodiment of an air cleaner assembly according to the present disclosure.

Attention is first directed to FIG. 17, in which is depicted a side elevational view of an air cleaner assembly 200 according to a second embodiment of the present disclosure. The air cleaner assembly 200 comprises a housing 202 having a main body portion 203 and a removable access cover 204. The main body 203 comprises a sidewall 207, an air flow inlet arrangement 208, and an air flow outlet arrangement 209. At 210 a tap for a restriction indicator is positioned at outlet 209.

The access cover 204 is secured in place by latch arrangement 214 comprising oppositely positioned latches 215, only one of the which is depicted in FIG. 17. The air cleaner assembly 200 includes an ejector arrangement 218 comprising ejector tube 219 with a valve arrangement 220 positioned thereover. The particular assembly depicted, the ejector arrangement 218 is positioned in the access cover 204 at a location at an opposite of the housing 202 from the inlet 208. The particular tube 219 depicted extends downwardly at an angle within the range of about 30°-60° to horizontal and vertical, when the air cleaner assembly is positioned with a central axis X extending horizontally. This a convenient direction for the tube 219 since it provides for an air cleaner assembly that can also be positioned with central axis X extending vertically, with outlet 209 pointed up while tube 219 is still directed generally downwardly.

In operation, air enters assembly through inlet 208. Within housing interior 202i, portion 225 provides for cyclonic ramp directing air inlet flow into cyclonic flow. This will help direct dust into injector arrangement 218. Air flow will eventually be through an internally received filter cartridge assembly, and then outwardly through air flow outlet 209 by which filtered air can be directed to downstream equipment, for example to an air in-take for an internal combustion engine. Typical use of an assembly in accord with air cleaner assembly 200 would be as an engine in-take air cleaner for the engine of a vehicle or construction equipment.

Assembly 200 is sometimes referred to as a "two-stage air cleaner" because it is an air cleaner having a precleaner stage, provided by a combination of a tangential flow inlet 208 (i.e. flow not directed toward central axis X, but rather tangentially thereto, along an outer sidewall 207) an internal cyclonic director 225, and, an ejector arrangement 218, which allow for preseparation of dust through cyclonic separation, as air is directed into the assembly 200. This is sometimes referenced as a first stage, with the second stage comprising a main filter cartridge positioned within interior 202i.

In FIG. 17, some example dimensions of an example system are indicated as follows: AA=189 mm; AB=139.5 mm; AC=25 mm; AD=40.25 mm; AE=122 mm; AF=46.5 mm; AG=44.5 mm; AH=25 mm; AI=69.9 mm; AJ=40.6 mm; AL=105 mm; AM=50°; and, AN=15 mm. Of course systems of alternate sizes incorporating principles described herein in connection with FIGS. 17-37 can be constructed. It is noted that when the housing is relatively small, for example with an overall length of only about 200 mm, and an overall diameter of only about 125 mm, typically a service provider having access to access cover 204 will be able to see over housing 202 sufficiently to view an visual indicator on a restriction indicator associated with tap 210. Thus a utility conduit analogous to the assembly depicted in FIG. 1 will sometimes not be needed, with small housings. This is advantageous, since an internal radial projection associated with such a conduit, may interfere with good cyclonic flow for the precleaner or first stage separator.

Figure 18:
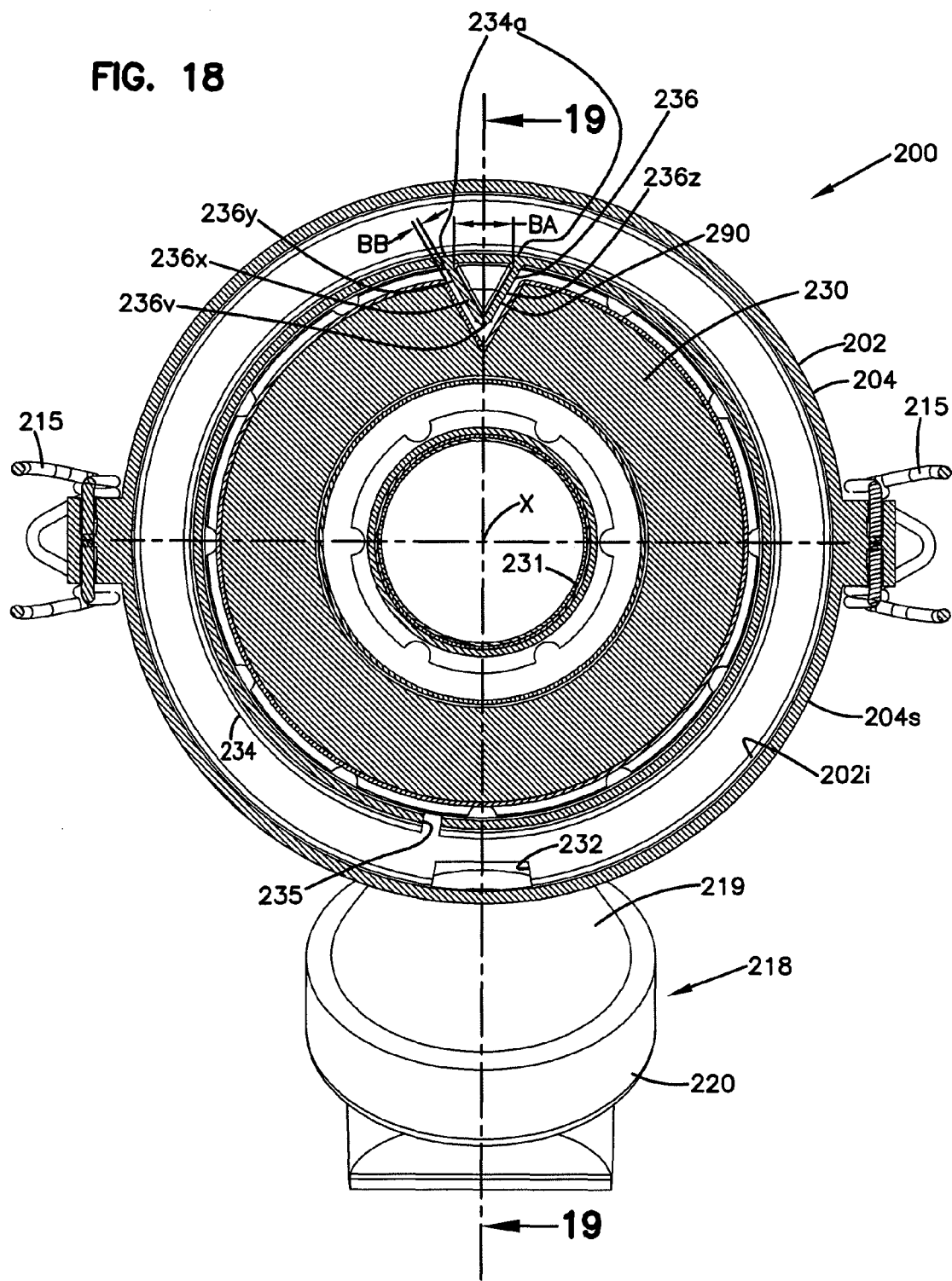
FIG. 18 is a schematic cross-sectional view taken generally along line 18-18, FIG. 17.

In FIG. 18, a cross-sectional view of air cleaner assembly 200 is taken generally along line 18-18, FIG. 10. Portions of an internally received main filter cartridge 230 and optional safety cartridge 231 are viewable in cross-section, schematically. Also referring to FIG. 18, at 232 an ejector aperture in sidewall 204s of access cover 204 is viewable, allowing cyclonically separated dust to exit housing interior 202i and to pass into ejector tube 219. Any internally received water can be ejected from interior 202i in a similar manner.

Also referring to FIG. 18, shield 234 in access cover 204, positioned surrounding cartridge 230, is depicted. Shield 234 includes: drain gap 235 extending therethrough; and, central internal radial projection arrangement 236. These features are discussed further herein below.

In FIG. 18, some example dimensions are indicated as follows: BA=9.7 mm; BB=1 mm.

Figure 19:
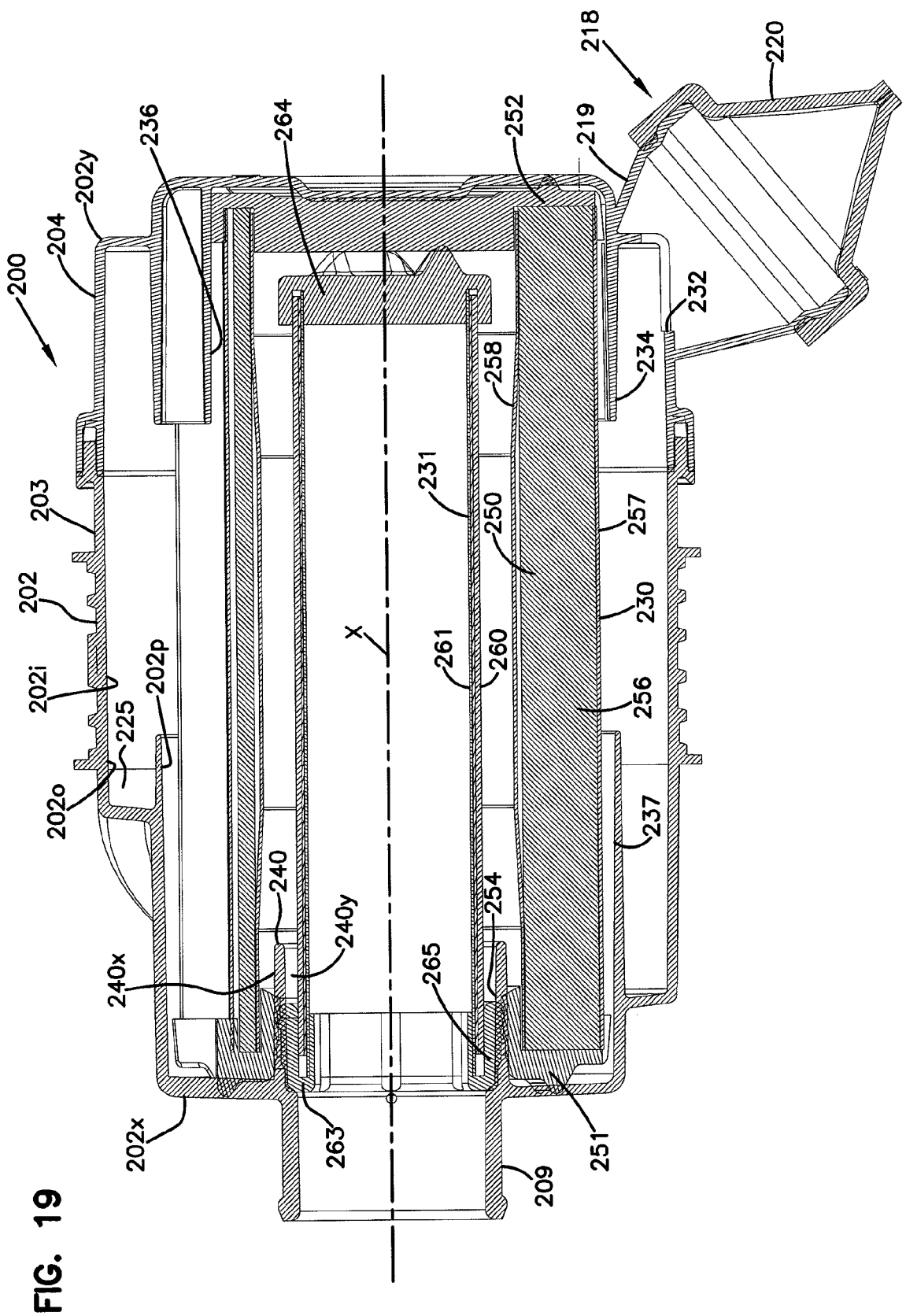
FIG. 19 is a schematic cross-sectional view of the assembly of FIG. 17, taken generally from the orientation of line 19-19, FIG. 18.
Figure 20:
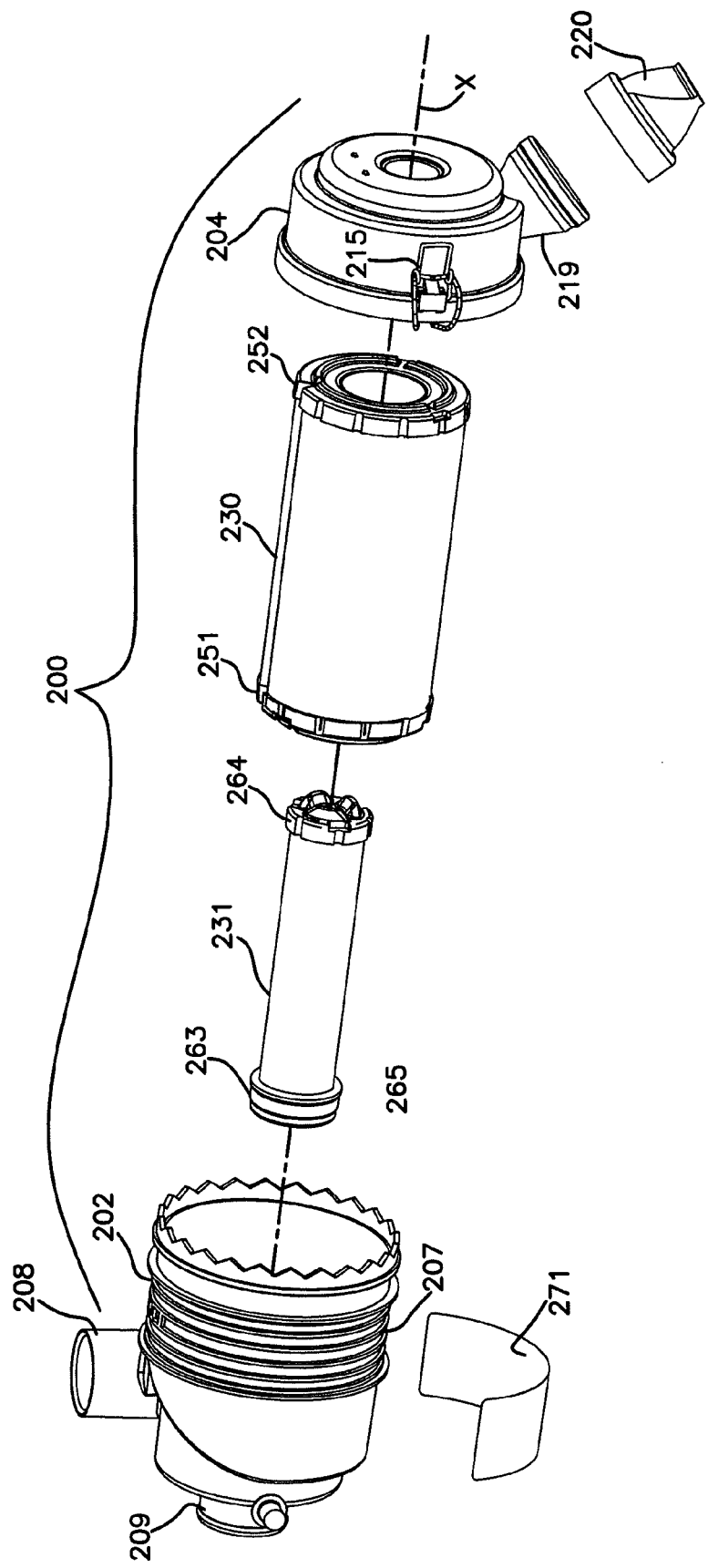
FIG. 20 is a schematic exploded perspective view of the assembly of FIGS. 17-19.

In FIG. 19, a cross-sectional view through air cleaner assembly 200 is taken generally in the direction of line 19-19, FIG. 18, as shown. In FIG. 20 an exploded perspective view of air cleaner assembly 200 is depicted.

Referring to FIG. 19, interior 202i of housing 202 can be seen as divided into two regions or sections: an outer, annular section 202o; and, an inner, cartridge mounting section 202p. In general the outer annular 202o surrounds the inner cartridge section 202p. The outer annular section 202o includes ramp 225. As referenced above, as air enters inlet 208, FIG. 17, it is directed by ramp 225 into a cyclonic (i.e. helical or spiral) pattern. That cyclonic pattern is generally in region 202o. Again, it will lead to some separation of dust and other materials carried by the air, which is eventually directed outwardly from housing 202 through ejection port 232 into ejector arrangement 218. It is convenient to have a generally circular outer wall in region 202o (in cross-section) so that the air flow path which facilitates the cyclonic dust separation is not substantially disrupted. Thus, for the particular example assembly 200 depicted, there is no inwardly projecting conduit structure analogous to structure 25i, FIG. 5.

Referring still to FIG. 19, end 202x of the housing 202 is positioned adjacent outlet 209. At end 202x, housing interior 202i includes a shield or flange arrangement 237 projecting inwardly, and surrounding the main filter cartridge 230. The portion of the cartridge 230 surrounded by the flange or shield 237 is a portion generally adjacent end 202x when mounted, often extending along a length of the cartridge 230 that it is no more than 60% of its length, usually no more than 50% of its length and typically no more than 40% of its length.

The flange arrangement 237 helps define cyclonic motion in the region of the ramp 225, so that inlet air does not directly impact the media of the cartridge 230 in this region, but rather is directed into the cyclonic pattern.

Adjacent end 202y of the housing 202, defined in the example by access cover 204, is provided a second flange arrangement 234, referenced above. Flange arrangement 234 generally surrounds the cartridge 230 in a region located adjacent end 202y, i.e. at an opposite end of the cartridge at housing end 202x. Flange arrangement 234 generally provides a shield surrounding the cartridge 230 at this location, facilitating dust collection in annular region 202o and dust direction through port 232.

Referring to FIG. 19, flange 234 generally extends along cartridge 230 a distance corresponding to no more than 50% of the cartridge length, typically no more than 40% of the cartridge length and usually no more than 30% of the cartridge length. Typically at least 15% (and usually at least 25%) of the cartridge axial length is not surrounded by either of the flanges 237, 234.

Still referring to FIG. 19, at region 236, a radial inward projection arrangement 236 from flange 234 is provided. The radial inward projection arrangement 236 provides for the possibility of an interference fit with a portion of the cartridge 230, as discussed generally below.

Attention is again directed to FIG. 18. In FIG. 18, radial projection arrangement 236 is viewable projecting radially inwardly from an adjacent portions 234a of flange 234. Projection arrangement 236 for the arrangement depicted, generally comprises a v-shaped structure 236x with a vertex 236v most radially inwardly, with opposite sides 236y, 236z extending radially outwardly from the vertex 239v. Alternate shapes are possible. In addition, an alternate number of projections 236 are possible. Typically, the radial projection arrangement 236 will only comprise a single projection 236x. However, if it does include more than one projection, typically flange 234 includes at least one section having an arcuate extension of at least 80° without an interference projection 236x therein, usually such an extension of at least 160° and often such an extension of at least 270°.

For the particular projection 236x depicted, an angle between the sides 236y, 236z, in extension from vertex 236v, is typically not more than 90°, usually not more than 80°, typically at least 5°, and often within the range of 20°-70°, inclusive. The total radial inward projection of the projection 236x from shield or flange 234 is typically at least 0.5 mm; usually at least 1 cm, and typically at least 5% of a direction toward central axis X, usually at 10% of the projection toward central axis X and typically not more than 60% of a distance toward central axis X.

Referring to FIG. 18, gap 235 and flange 234 is generally positioned to facilitate water drainage from interior 234i of flange 234 should rainwater, etc. collect in this region.

It is noted that a projection analogous to projection 236x could be positioned adjacent an opposite end 202x of the housing 202, either in addition or alternative, for interaction with a portion of filter cartridge positioned therein.

Referring again to FIG. 19, attention is directed to seal flange 240 which generally projects axially inwardly from end 202x of housing 202, and which surrounds an outlet flow path to outlet arrangement 209. Seal flange 240 has a radially outer surface 240x and a radially inner surface 240y. The outer surface 240x defines a seal surface for the main cartridge 230 and the inner surface 240y defines a seal surface for the safety cartridge 231.

Still referring to FIG. 19, attention is generally to main filter cartridge 230. The main filter cartridge 230 comprises a media pack 250 positioned in extension between first and second, opposite, end pieces or caps 251, 252. The first end piece 251 is an open end cap, and surrounds and defines central aperture 254. The central aperture 254 defines an inwardly directed radial seal, for removable sealing against seal surface 240x when the cartridge 230 is installed and pushed over flange 240. Typically end cap 251 will be formed from a material such as a foamed polyurethane as discussed above with respect to end cap 52.

End cap 252 is a closed end cap in the example depicted, i.e. has no aperture therethrough. Typically end cap 252 will be either formed from an analogous urethane, or a hard urethane, although alternatives are possible.

Still referring to FIG. 19, media pack 250 comprises media 256 surrounded by an outer liner 257 and surrounding an inner liner 258. The media pack 250, i.e. media 256 and liners 257, 258 are shown embedded in, and extending between, end pieces or caps 251, 252.

The optional safety cartridge 231 depicted comprises media 260 surrounding an inner liner 261 and extending between first and second end pieces or caps 263, 264. End cap 263 is an open end cap, defining an outer radial seal surface 265 sized and oriented to seal against seal surface 240y when cartridge 231 is installed. End cap 264, in the example depicted, is a closed end cap. End cap 263 can be formed, for example, of a urethane analogous to the foamed urethane discussed above for end caps 251, 52. End cap 264 can be formed from a similar material or a hard material.

Referring to FIG. 18, it is noted that cartridge 230 includes a recess arrangement 290 therein sized to receive (projecting thereinto) projection arrangement 236. For the example cartridge 230 depicted, this comprises at least: a recess portion in the end cap 252, and a conduit or recess in the media pack 250, as discussed below. It can also include a recess in end cap 251, as shown and discussed below, but one is not required for the particular example depicted in FIGS. 17-37.

Before turning to the cartridge 230, additional features of the assembly 200 will be reviewed in connection with FIGS. 20-25.

In FIG. 20, an exploded perspective view of assembly 200 is depicted. A housing main body 207 is shown in a region sized and configured to receive label 271 thereon.

Figure 21:
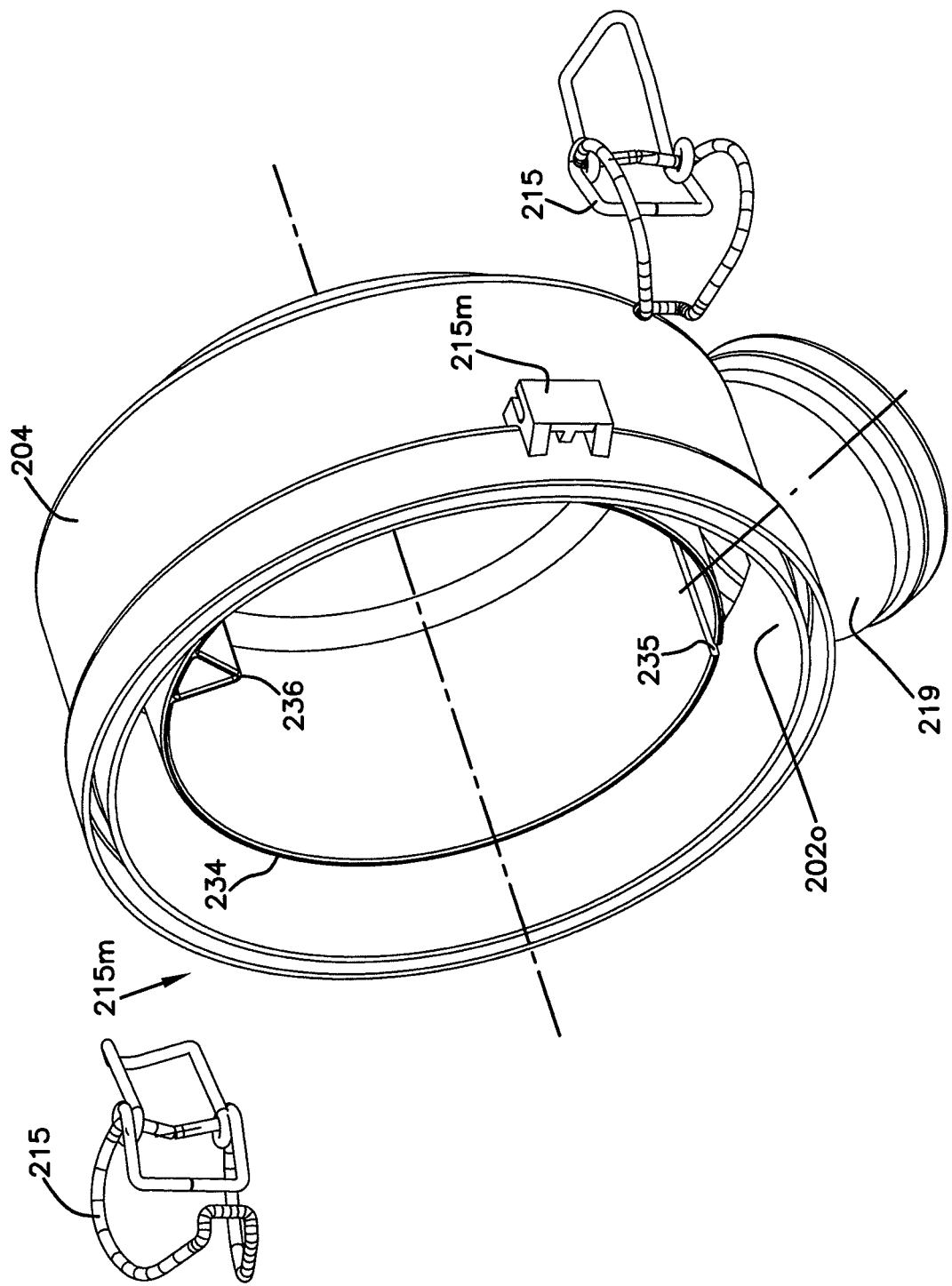
FIG. 21 is a schematic exploded perspective view of an access cover of the assembly of FIG. 20.
Figure 22:
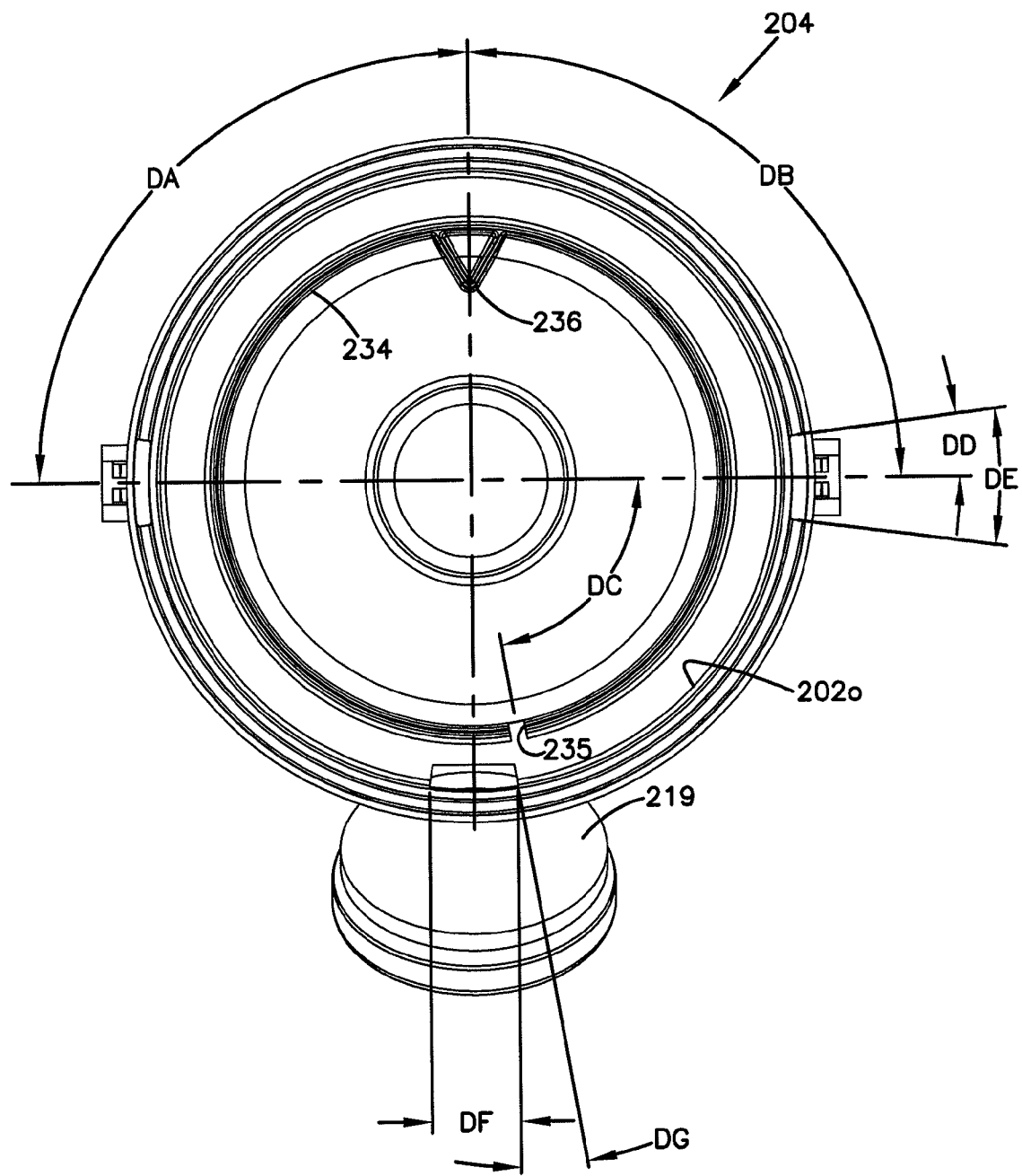
FIG. 22 is a schematic elevational view taken toward an interior of the access cover of FIG. 21.

In FIG. 21, access cover 204 is depicted in exploded, perspective, view. The access cover 204 is depicted without valve member 220, FIG. 19 thereon. It is also shown with latches 215 exploded from mounts 215m. In FIG. 21, flange or shield arrangement 234 can be seen defining portion of annulus 202o. Also, projection 236 within flange 234 can be viewed. In FIG. 22, an interior plan view or end view of access cover 214 is shown. Features previously described are similarly labeled. In FIG. 22, some example dimensions and angles are provided as follows: DA=90°; DB=90°; DC=80'; DD=7.3°; DE=14.6°; DF=16 mm; and, DG=10°.

Figure 23:
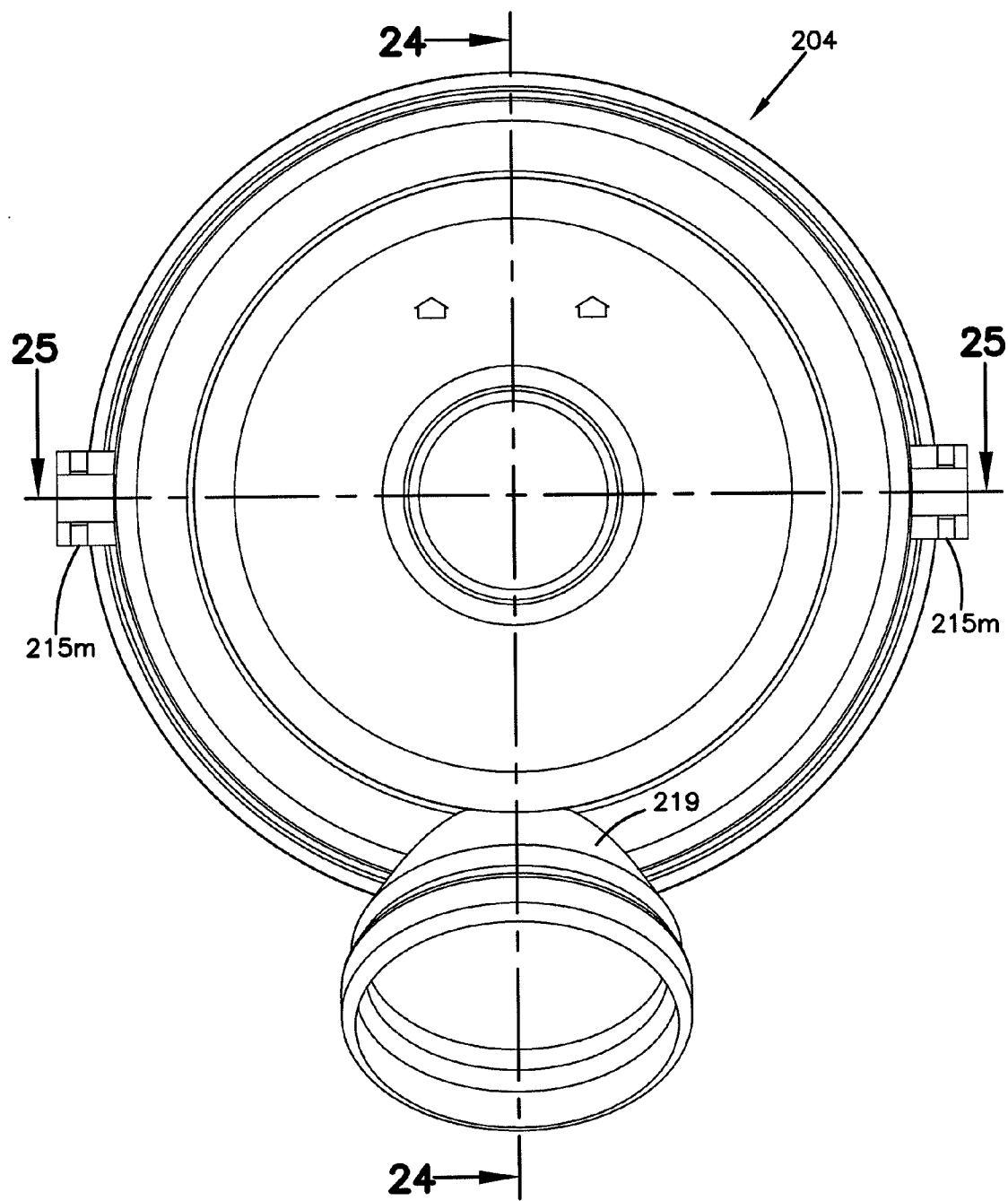
FIG. 23 is a schematic end elevational view taken toward an exterior of the access cover of FIG. 21.
Figure 24:
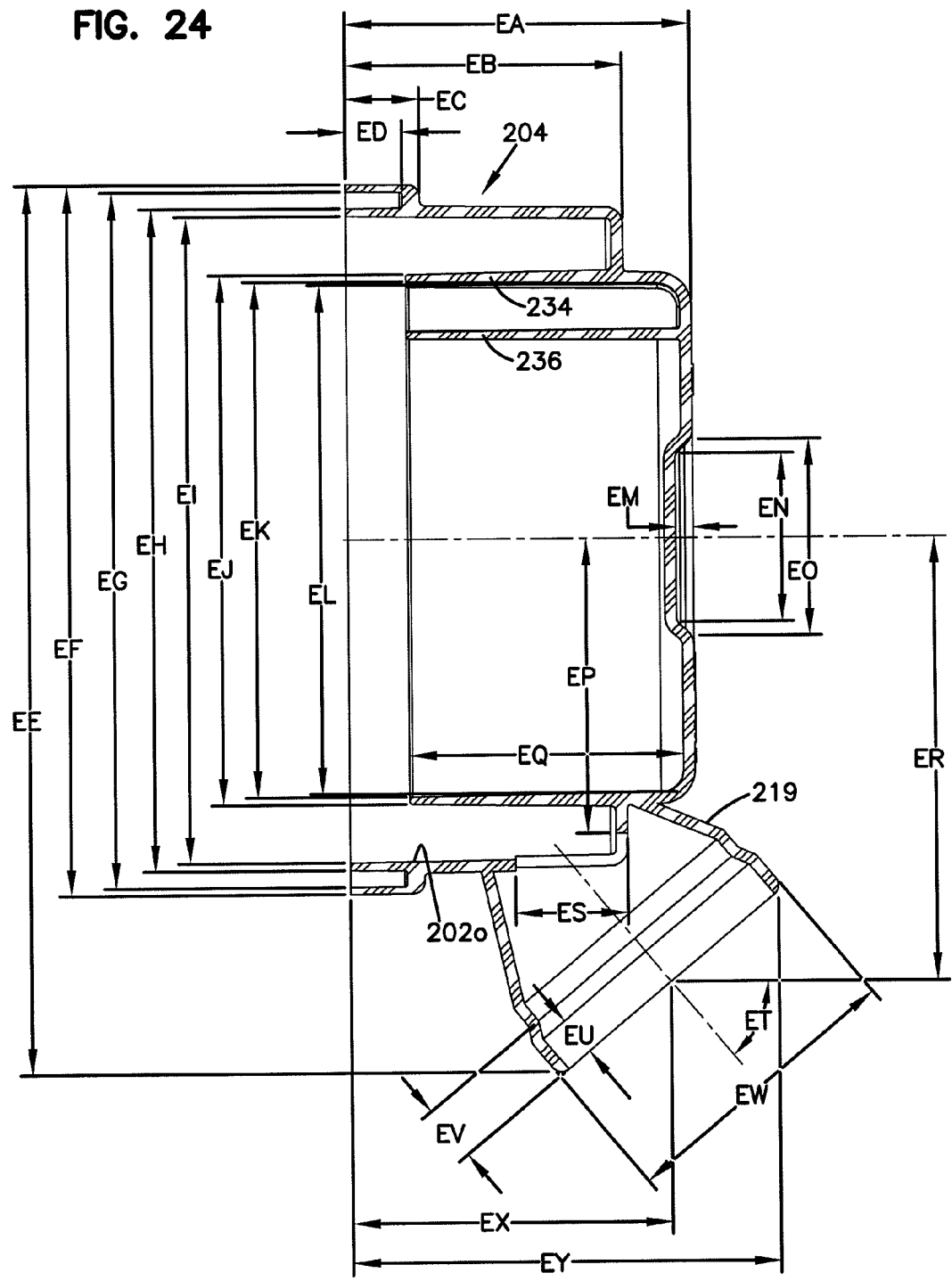
FIG. 24 is a schematic cross-sectional view taken generally along line 24-24, FIG. 23.

In FIG. 23, an exterior view of the access cover 214 in FIGS. 21 and 22 is provided. In FIG. 24, a cross-sectional view taken generally along line 24-24, FIG. 23 is shown. In FIG. 24, some example dimensions are provided as follows: EA=61 mm; EB=49 mm; EC=13 mm; ED=10 mm; EE=158 mm; EF=126.2 mm; EG=123.7 mm; EH=117.7 mm; EI=115 mm; EJ=94.2 mm; EK=91.5 mm; EL=90.5 mm; EM=3 mm; EN=30 mm; EO=35 mm; EP=52.5 mm; EQ=48.5 mm; ER=79 mm; ES=20 mm; ET=50°; EU=7 mm; EV=7 mm; EW=52 mm; EX=56.5 mm; and, EY=76 mm.

Figure 25:
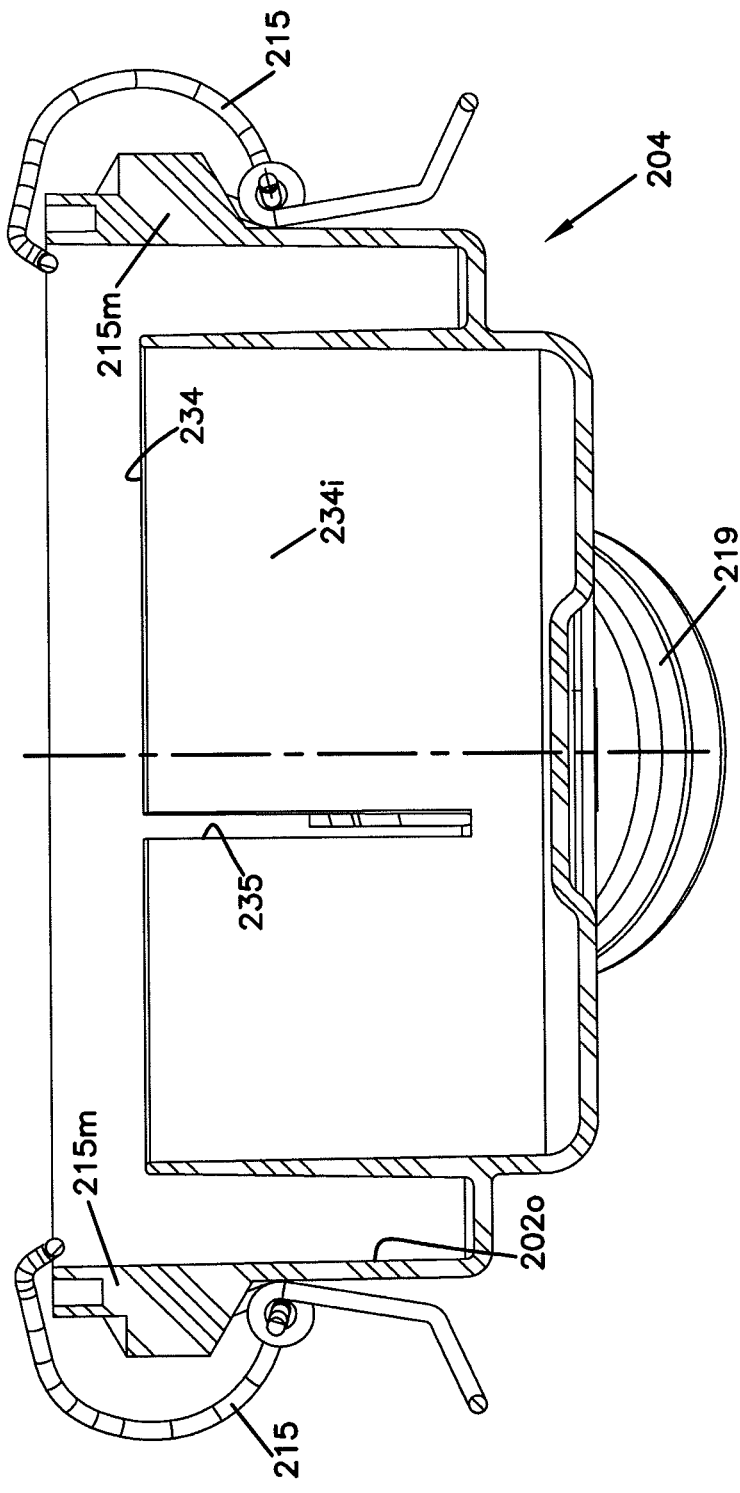
FIG. 25 is a schematic cross-sectional view taken generally along line 25-25, FIG. 23, depicting the access cover with the latches of FIG. 21 thereon.

In FIG. 25, a cross-sectional view taken generally along line 25-25, FIG. 23, is shown. Here, slot 235 in flange 234 is shown. The slot 235, again, is generally in a lower portion of the flange 235 and provides for drainage from an interior 234i flange 234 of any water that collects therealong.

Figure 26:
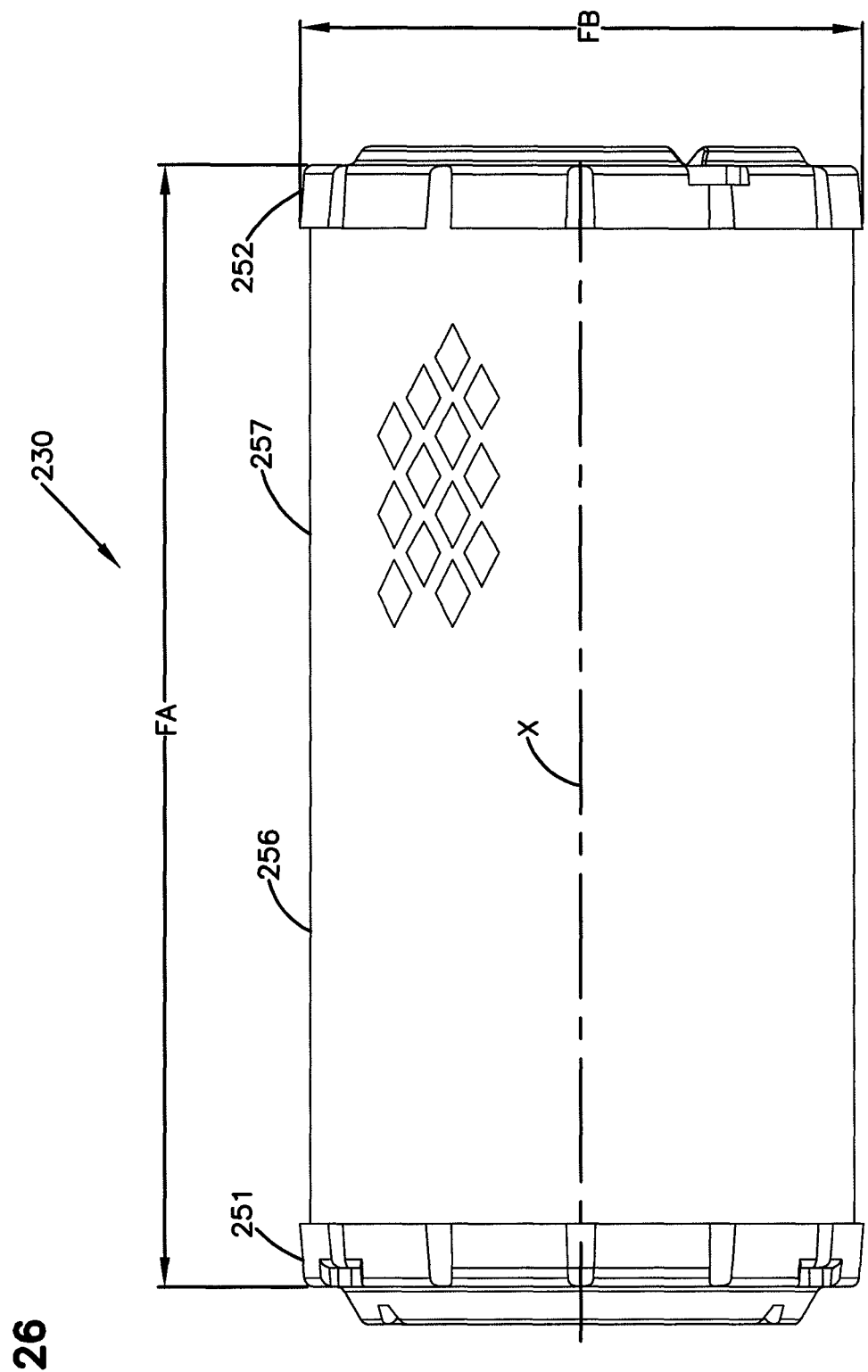
FIG. 26 is a schematic side elevational view of a filter cartridge usable in the assembly of FIG. 17.

In FIGS. 26-37, features of the main filter cartridge 230 are depicted. Referring first to FIG. 26, filter cartridge 230 is depicted in plan view. In FIG. 26, some example dimensions are provided as follows: FA=179 mm; and; FB=89.5 mm.

Figure 27:
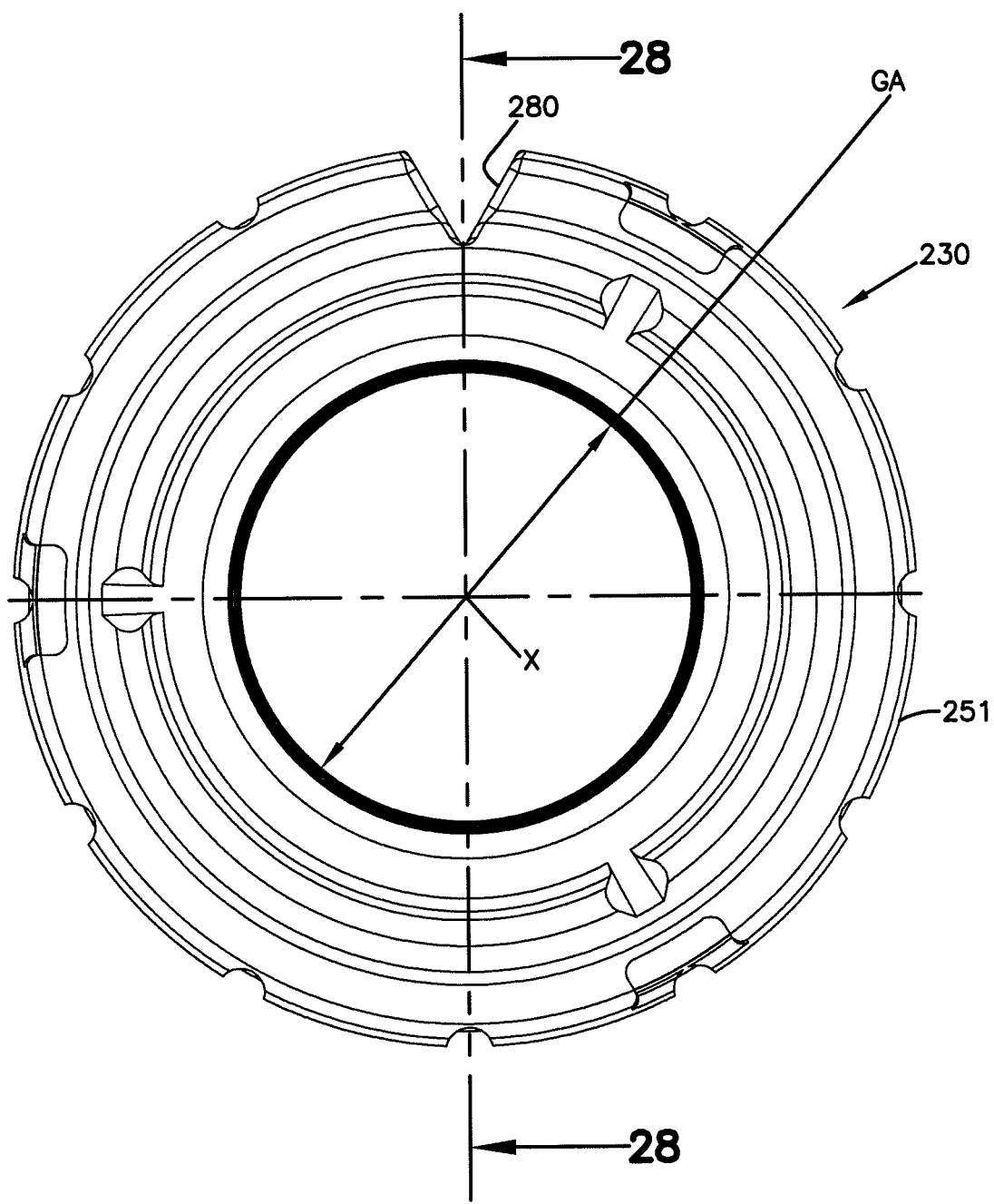
FIG. 27 is a schematic end elevational view of the cartridge of FIG. 26.

In FIG. 27, an end view toward end piece 251 is provided. Referring to FIG. 27, a dimension is provided as follows: GA=44.9 mm.

Figure 28:
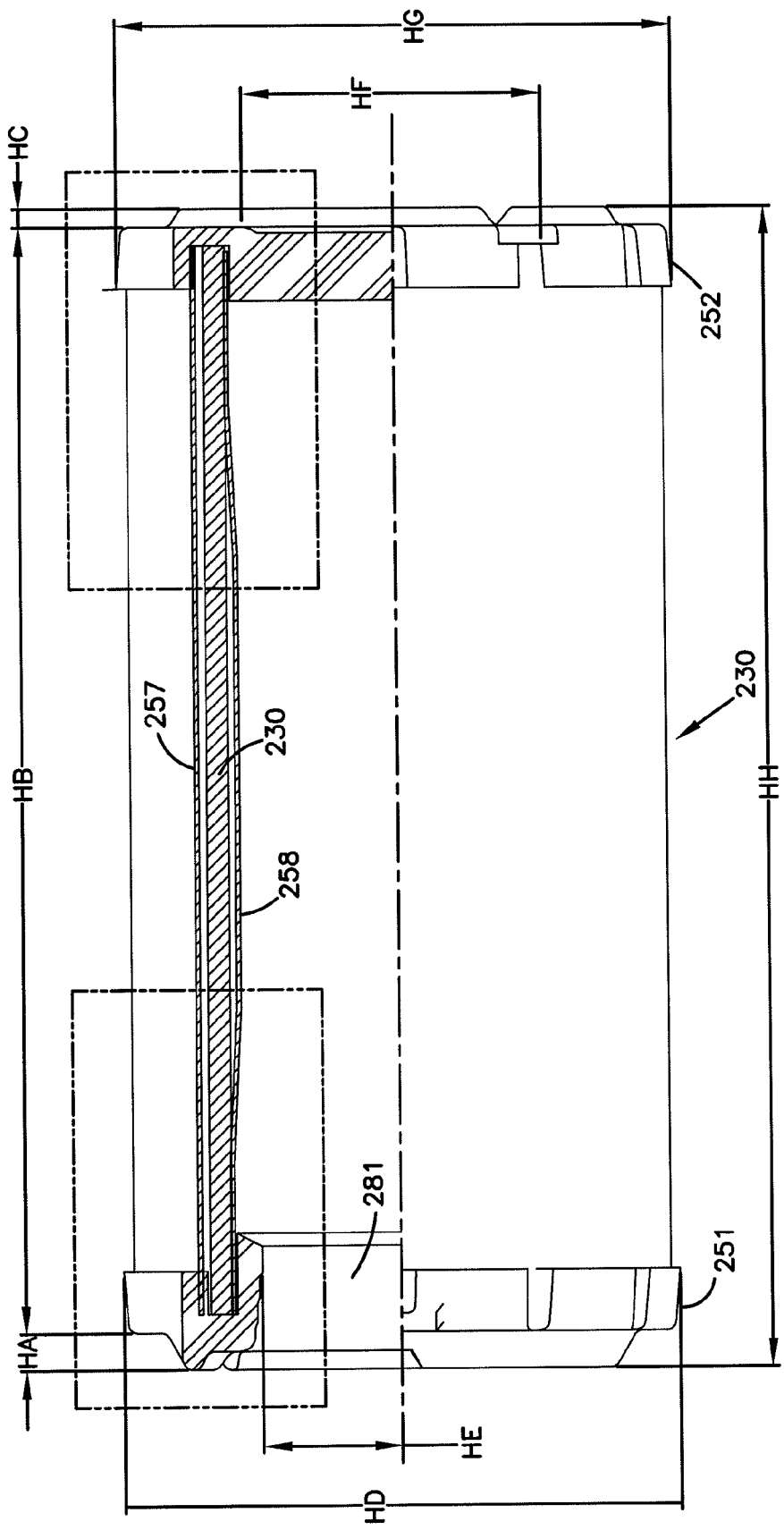
FIG. 28 is a schematic view analogous to FIG. 26, of the filter cartridge, with portions shown broken away an in cross-section.

In FIG. 28, a view analogous to FIG. 26 is depicted, with portions shown broken away and in cross-section. It is noted that cross-sectional view of FIG. 28 is taken generally along line 28-28, FIG. 27. Thus the cross-sectional view is taken through indent or conduit 280, FIG. 27.

In FIG. 28, example dimensions are as follows: HA=6 mm; HB=179 mm; HC=3 mm; HD=89.9 mm; HE=22.4 mm diameter; HF=48 mm; HG=89.9 mm; HH=188 mm In FIG. 29 a plan view of end cap 251 is shown. In FIG. 30, a portion of end cap 251 is shown in cross-sectional view. Comparing FIGS. 29 and 30, aperture 253 in end cap 251 can be seen as defining a radial seal surface 281, as an inwardly directed housing seal to engage surface 240x of flange 240, FIG. 19 during installation. Referring to FIG. 30, end cap 251 has an outer perimeter 282 and axial end surface 283 on an opposite side of the end cap 251 from the media pack 250. End cap 251 includes a recess arrangement in the perimeter 282 thereof, indicated generally at 285. Recess arrangement 285 comprises one or more recesses 285r, in the example depicted a single recess 285r being depicted. The particular recess 285r shown is designated by reference numeral 286. It can be generally analogous to recess 61, FIG. 8 or region 76, FIG. 7, if desired. However, it is noted that recess 286 does not actually need to clear any structure within housing 205 during installation, when the housing 202 is as depicted, in FIG. 19. Typically recess 286, will extend into axial overlap, with a region between pleats, when the media is pleated.

For the particular embodiment depicted, the recess has a generally v-shape, and extends at least 5% of the way across the end cap 251 from outer perimeter 282 toward central aperture 253, usually at 10% of this distance, and typically at least 15% of this distance. Generally the total amount of recess is at least 0.5 cm, typically at least 0.75 cm, often within the range of 0.75-3 cm inclusive, although alternatives are possible. For the example depicted, the recess 286 extends completely through end cap 251, and can be characterized as having a v-shape with opposite sides 286x, 286y, extending radially outwardly from a central vertex 286z. The angle of sides 286x, 286y in extensions outwardly from vertex 286z is typically at least 15°, typically not more than 80°, and often within the range of 20°-70°. In arc Y over which recess 286 extends, adjacent an intersecting out of perimeter 282, is typically at least 5° usually not more than 50° and often within the range of 10°-25°, inclusive, around central axis X.

Typically if the end cap 251 includes any recess therein at all of the type corresponding to recess 286, it includes only one. However, it may include more than one, if desired.

Figure 29:
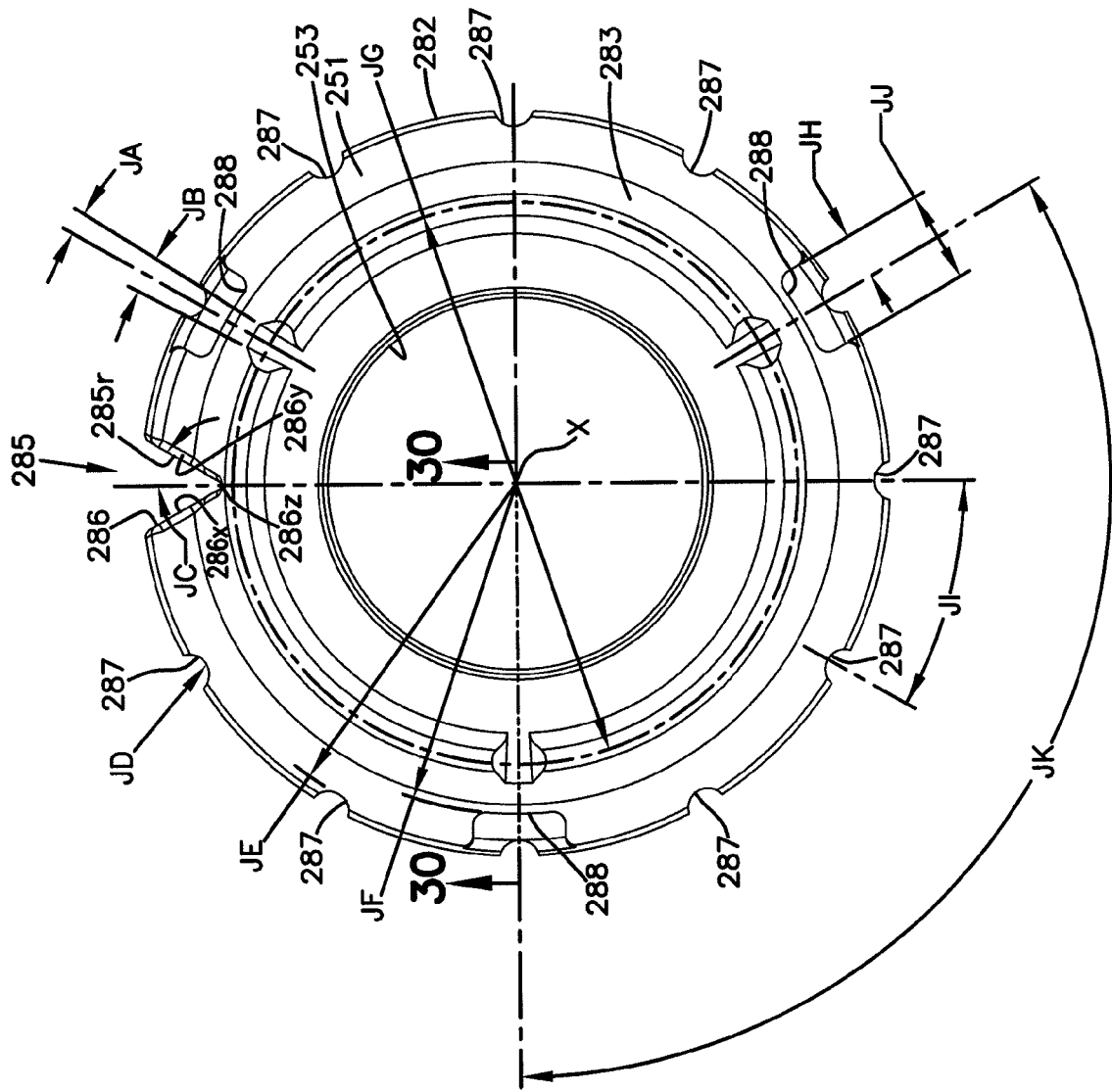
FIG. 29 is a schematic, enlarged plan view of an open end cap of the filter cartridge of FIG. 26.
Figure 30:
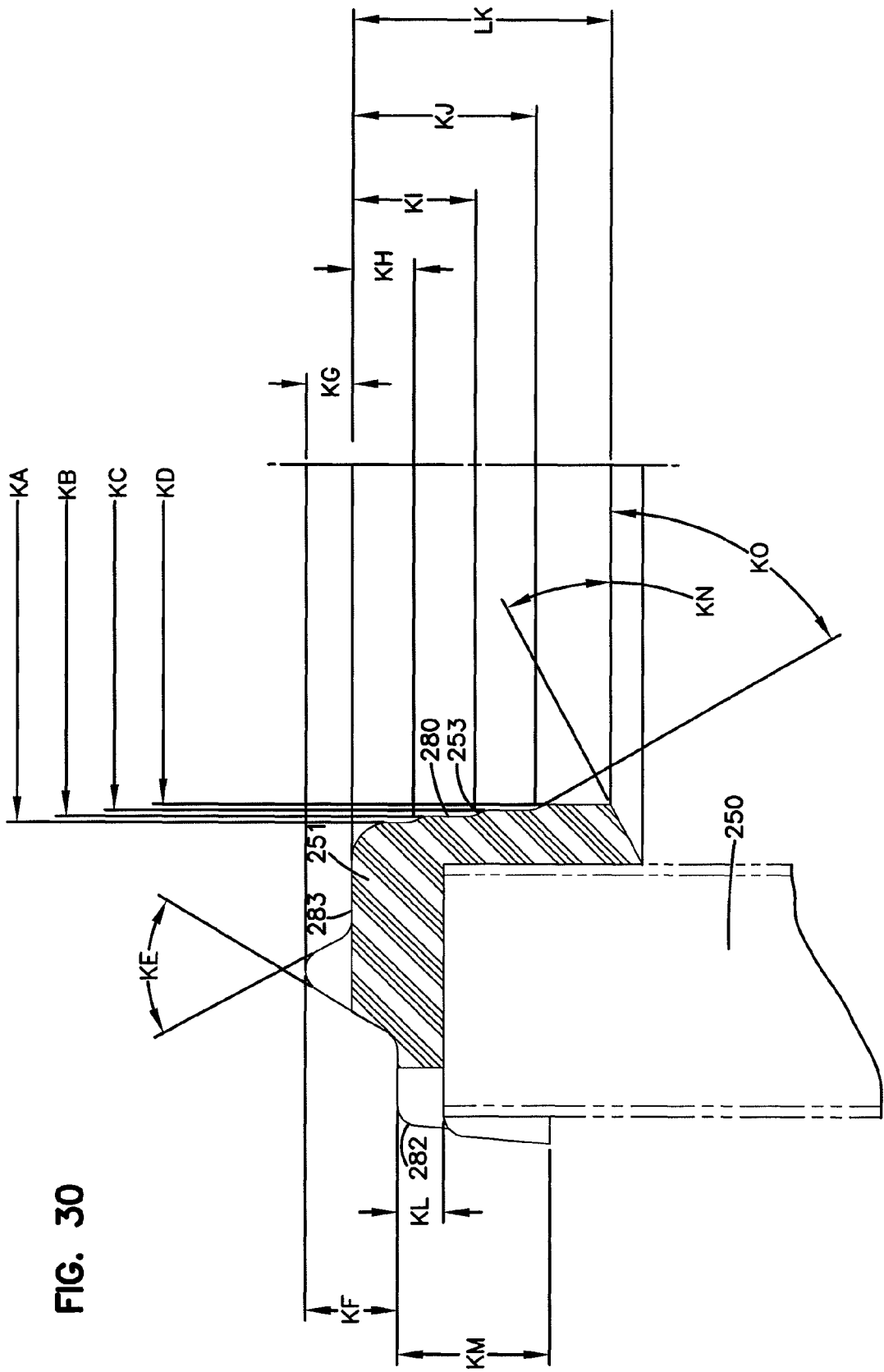
FIG. 30 is a schematic fragmentary view taken generally along line 30-30, FIG. 29.

Still referring to FIG. 29, at 287, mold centering recesses extending through end cap 251 are depicted, in perimeter 282. Typically such recesses as recesses 267 are relatively small, and do not extend radially inwardly more than about 3 mm. Also depicted are media support recesses 288 which typically extend toward (but no through to) the underlying media, in overlap therewith, that do not extend through end cap 251 radially, more than about 25%, between perimeter 282 and which 253, usually not more than 20%. Also, the typically they do not extend completely through the end cap 251 axially, but have at least a thin skin of urethane therein, over an axial end of the underlying media pack.

In FIG. 29, some example dimensions and angles are provided as follows: JA=2° 30'; JB=5°; JC=30°; JD=2.4 mm radius; JE=43.1 mm radius; JF=39.9 mm radius; JG=67.9 m diameter; JH=5.5 mm; JI=30°; JK=120°; JJ=11 mm.

In FIG. 30, a cross-sectional view taken generally along line 30-30, FIG. 29 is provided, of end cap 251. Phantom lines indicate where media 250 would typically be embedded. Aperture 253 and radial seal surface 280 are viewable. Example dimensions and angles are depicted as follows: KA=47.3 mm diameter; KB=56.5 mm diameter; KC=45.7 mm diameter; KD=44.9 mm diameter; KE=60°; KF=6 mm; KG=3 mm; KH=4 mm; KI=8 mm; KJ=12 mm; KL=3 mm; KM=10 mm; KN=28°; KO=60°; and, LK=17 mm.

Figure 31:
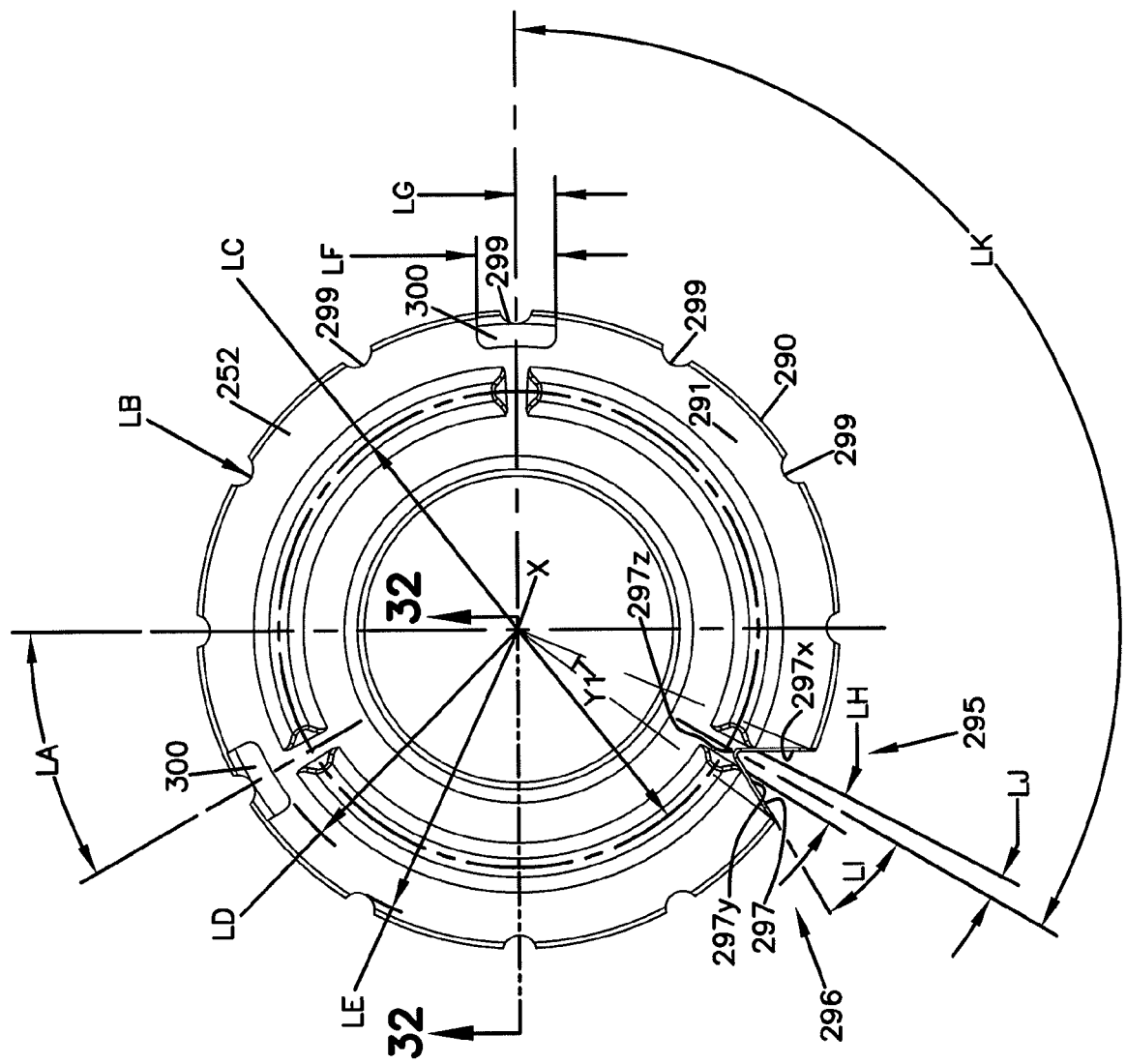
FIG. 31 is a schematic plan view of the closed end cap of a cartridge of FIG. 26.

In FIG. 31, a plan view of end piece 252 is viewable. The end piece 252 is closed, and has an outer perimeter 290. The end piece 252 also includes an axial end surface 291 which faces away from the media pack 250 in the opposite end cap 251.

End cap 252 includes a perimeter recess arrangement 295 comprising at least one recess 296. In the example arrangement depicted, the single recess 297 is shown. The perimeter recess arrangement 295 is generally sized and configured to receive projection 236, FIG. 18, extending therein, when cartridge two is installed in a housing 202. A variety of different shapes of recesses 296 can be used for this. The particular recess 297 extends completely, axially, through end cap 252 has a generally v-shape with opposite sides 297x, 297y extending radially outwardly from a central inner vertex 297z. Typically each recess 296, i.e. recess 297, extends radially across end cap 252 from outer perimeter 290 to central axis X a distance corresponding to at least 5% of the distance and typically at least 10% of the distance. Typically, the amount of extension is at least 0.5 cm usually at least 0.75 cm. It can be similar to recess 286.

The particular end cap 252 depicted, includes a single recess 297, although more can be provided. Typically, the outer perimeter 290 and end cap 251 is such that with respect to recess such as recess 97, the perimeter can extend at least 80°, typically at least 160°; and often 270° or more with out such a recess encountered.

The particular recess 297 depicted, is configured with sides 297x, 297y extending radially outwardly from vertex 297z at an angle of at least 15° and not more than 80° and typically within the range of 20°-50°, inclusive.

Typically along outer perimeter 290, recess 297 defines a gap or arc Y1 relative to central axis X of at least 5°, usually not more than 50°, typically within the range of 5°-50°, inclusive; usually 10°-40°, inclusive. This arc or gap Y1 is typically sufficiently large, to accommodate projection 236, FIG. 18. Still referring to FIG. 31, it is noted that perimeter 290 also includes mold centering recesses 299 therein; each typically not extending toward central axis X anymore than about 3 cm, typically not more than 3 mm. Also included are stand-off recesses 300 each of which typically does not extend completely through end cap 252. In FIG. 31, some example dimensions and angles are provided as follows: LA=30'; LB=2.4 mm radius; LC=67.2 mm diameter; LD=39.9 mm radius; LE=43.1 mm radius; LF=11 mm; LG=5.5 mm; LH=5°; LI=30°; LT=2°/30'; and, LK=120°.

Typically, the receiver 296 is sized so that when positioned over projection 236, cartridge 230 cannot rotate more than about 25°, typically no more than about 15°, and often no more than a minimal amount without encountering interference between projection 236 and recess 297.

Figure 32:
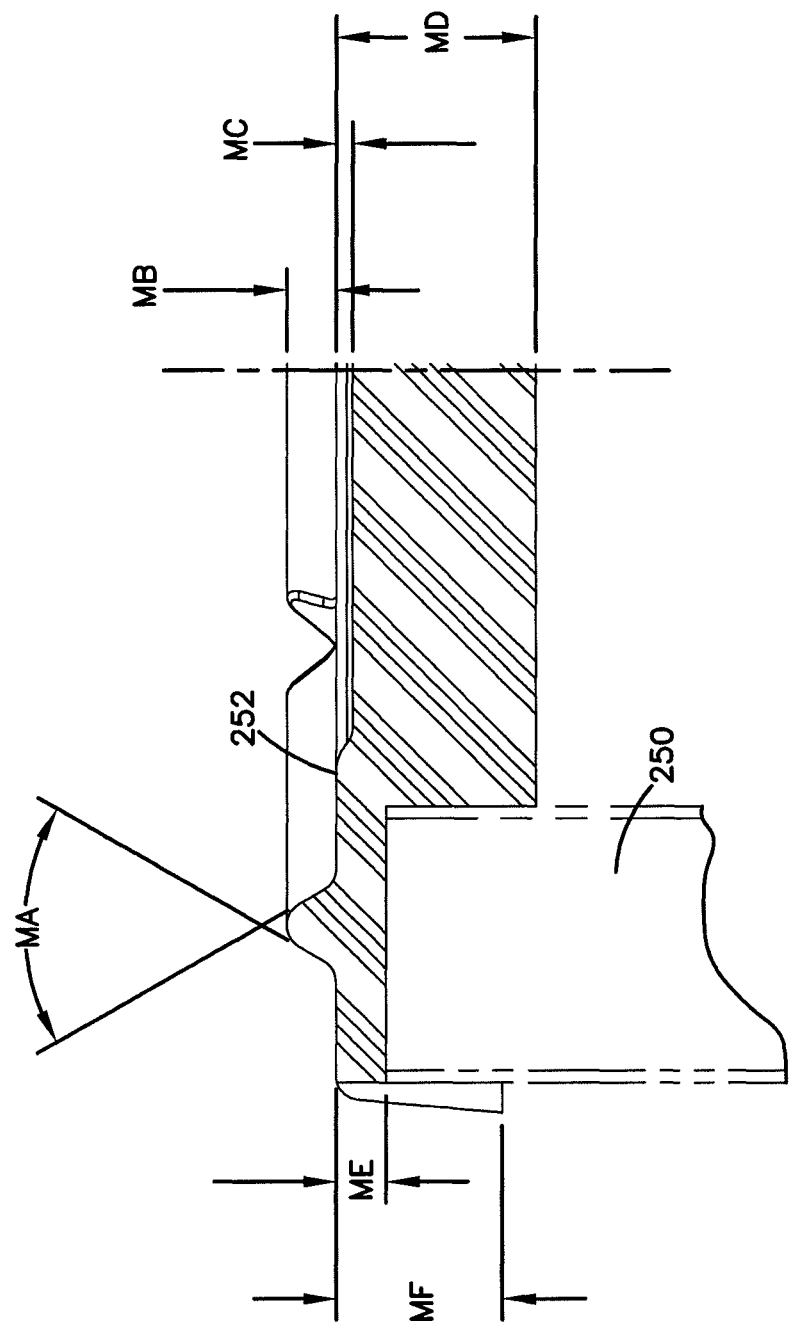
FIG. 32 is a schematic enlarged fragmentary view taken generally along line 32-32, FIG. 31.
Figure 33:
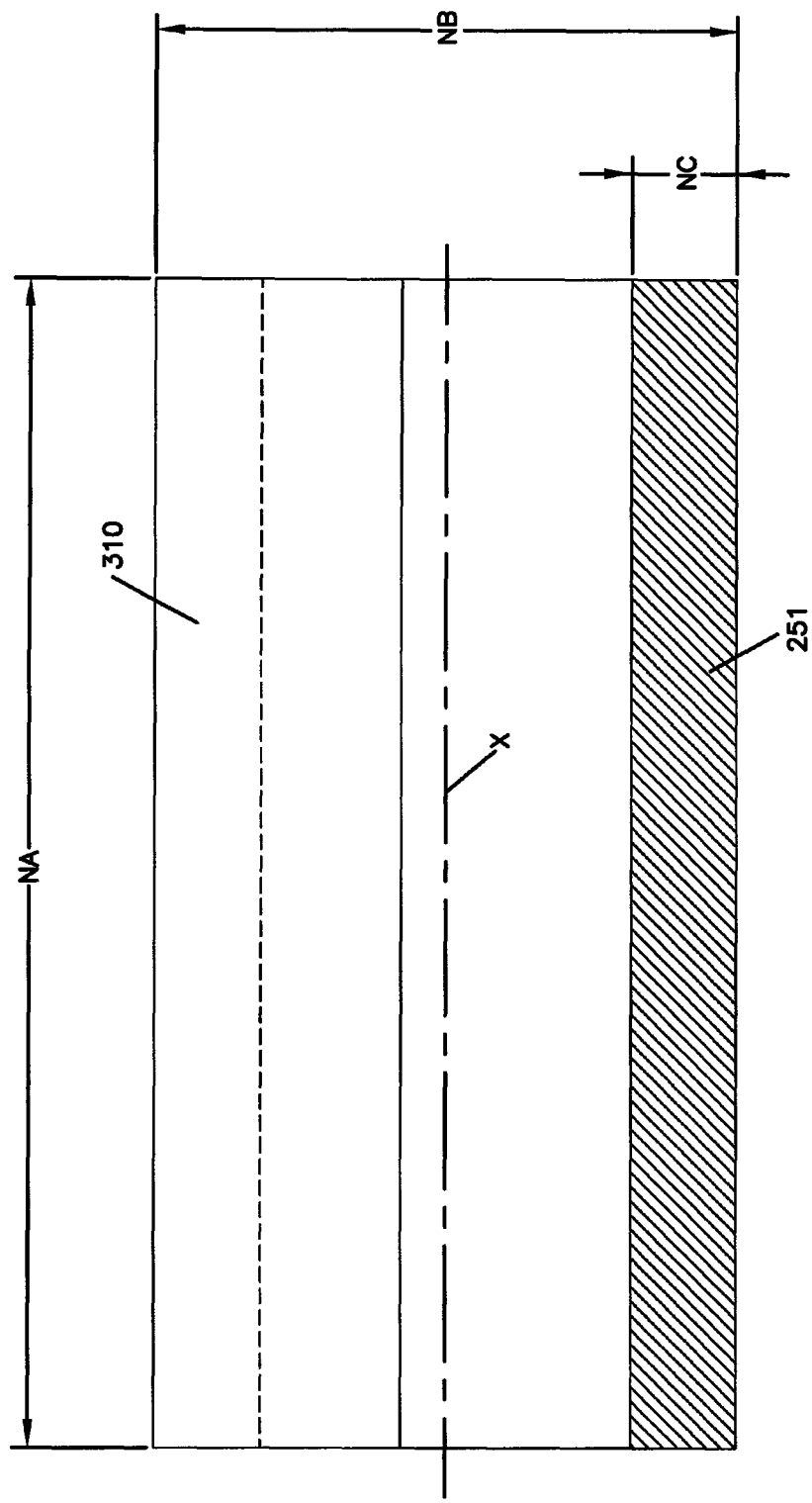
FIG. 33 is a schematic side elevational view of a media component of the cartridge of FIG. 26.

In FIG. 32, a cross-sectional view of end cap 252 taken along line 32-32, FIG. 31, is depicted. In phantom lines, media pack 250 is shown. Example dimensions in FIG. 33 are as follows: MA=60°; MB=3 mm; MC=1 mm; MD=12 mm; ME=3 mm; and, MF=10 mm.

In FIG. 33, a depiction of media 251 is schematically provided. The media 251 can comprise pleated media extending around a central axis X. At 310, a media recess in media 251 is provided, generally by providing spread apart pleats analogously to media discussed above. This allows receipt of a portion of projection 236 therein for clearance, FIG. 19.

Referring to FIG. 33, example dimensions are indicated as follows: NA=173 mm; NB=85.4 mm; NC=15.5 mm.

Figure 34:
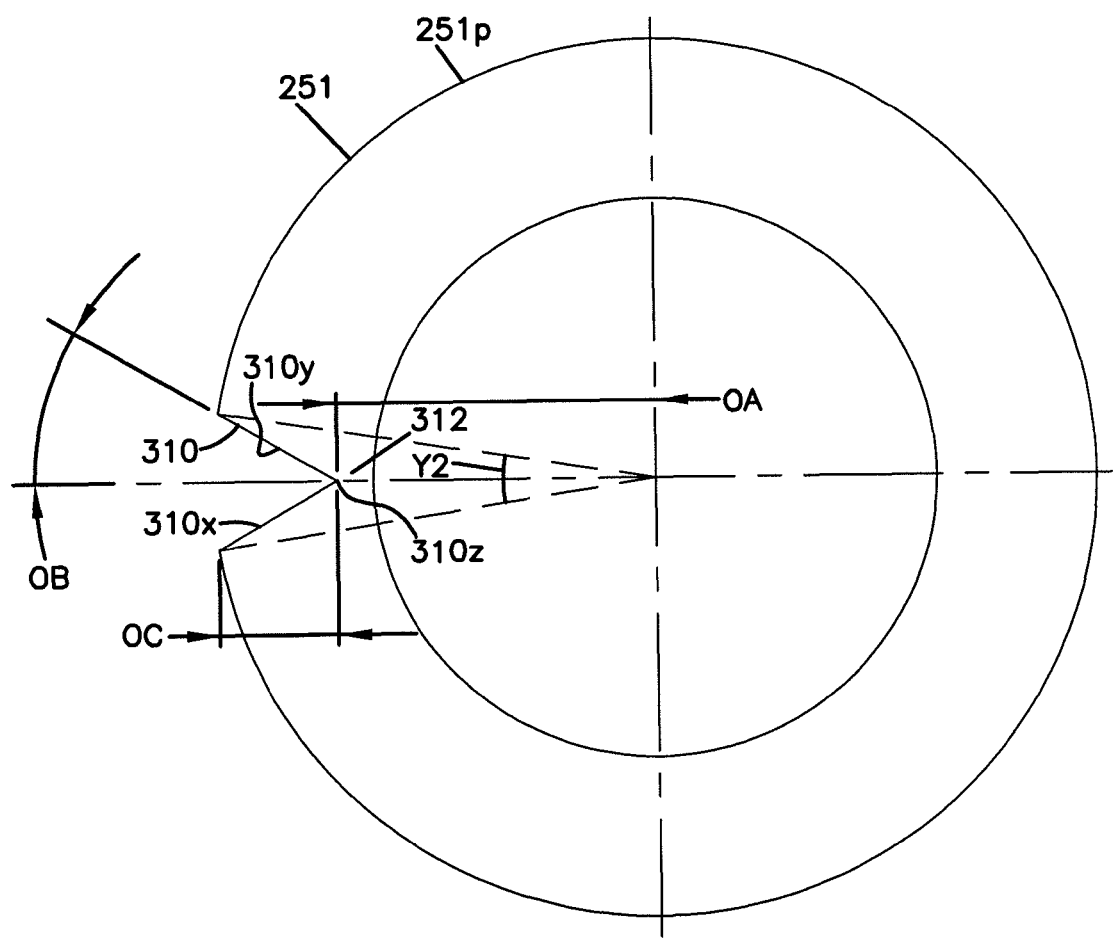
FIG. 34 is a schematic end elevational view of the media of FIG. 33.

In FIG. 34, recess 310 in media 251 is depicted schematically. Again, typically a recess 310 will comprise two pleats spread apart wider than the remaining pleats within the media 251. The schematic depiction shows recess 310 extending along an outer perimeter, over an arc Y2 of at least 5°, typically at least 10°, usually not more than 50°, for example within the range of 5°-50°, inclusive, an example, being 10°-40°, inclusive. Although there can be more than one recess, analogous to recess 310, this will typically not be the case. If there is more than one recess, typically the media pack 251 will define a perimeter 251p that has at least one section that extends over a arc of at least 80°, typically at least 160°, and in some instances 270° or more, without encountering such a recess.

The recess 310 depicted, has opposite sides 310x, 310y extending outwardly from a central vertex 310z over an angle of at least 5°, typically not more than 80° and often within the range of 20°-70°, inclusive.

Typically the recess 310 extends radially inwardly from perimeter 251p a distance corresponding to at least 0.5 cm usually at least 0.75 cm, often 1 cm or more.

Of course in many instances for pleated media, the media pack in region 312 will simply have a thickness corresponding to thickness of the media.

In FIG. 34 some example dimensions and angles are indicated as follows: OA=30.7 mm; OB=30'; and, OC=11.5 mm.

Figure 35:
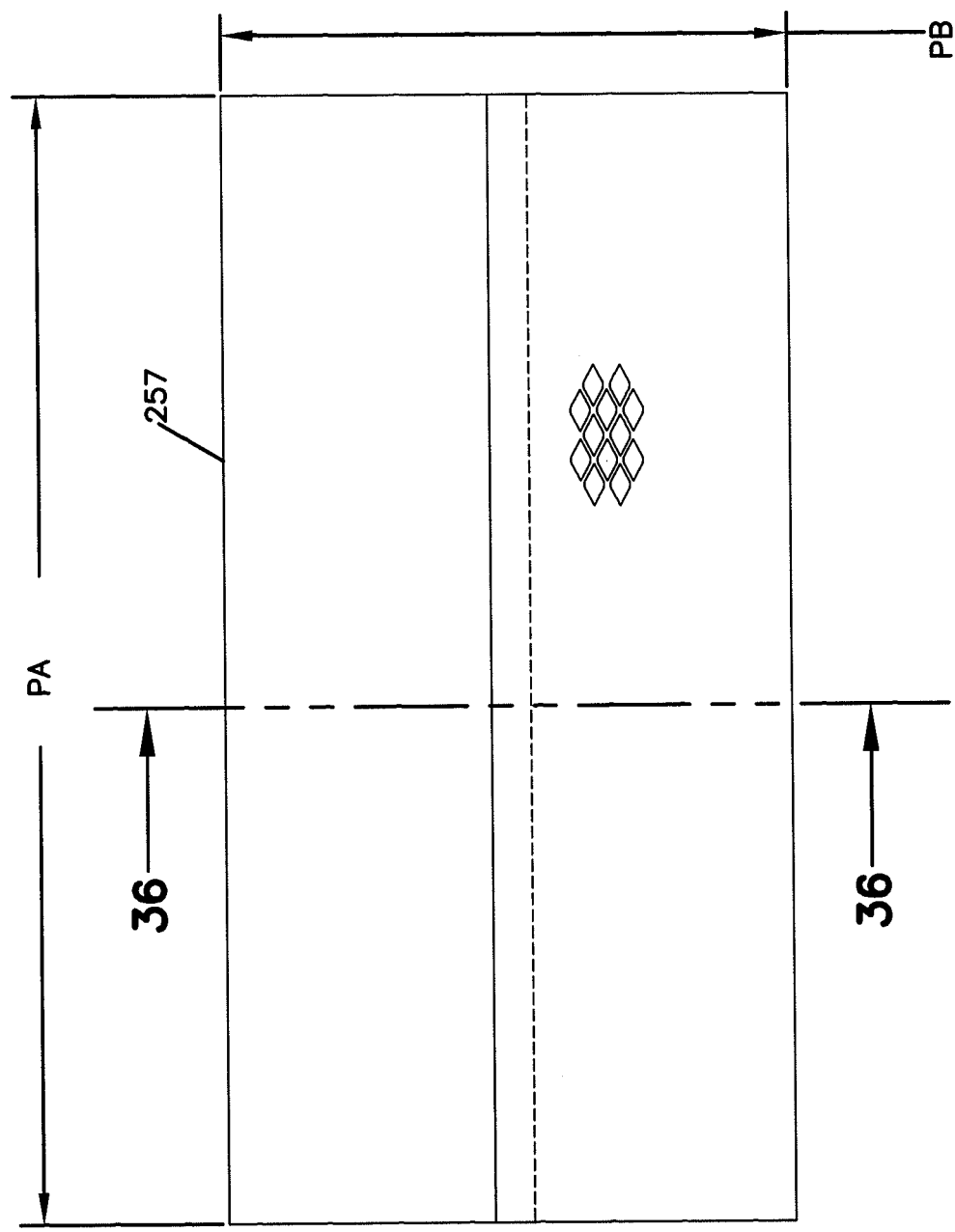
FIG. 35 is a schematic side elevational view of an outer liner of the cartridge of FIG. 26.

Referring back to FIG. 19, it was indicated that cartridge 230 had an outer liner 257. The outer liner 257 is depicted in FIG. 35. The outer liner 257 can comprise a metal piece, such as an expanded metal piece or perforated metal piece or a molded plastic piece. The example depicted comprises expanded metal. In FIG. 35, some example dimensions are provided as follows: PA=173 mm; and, PB=86.33 mm.

Figure 36:
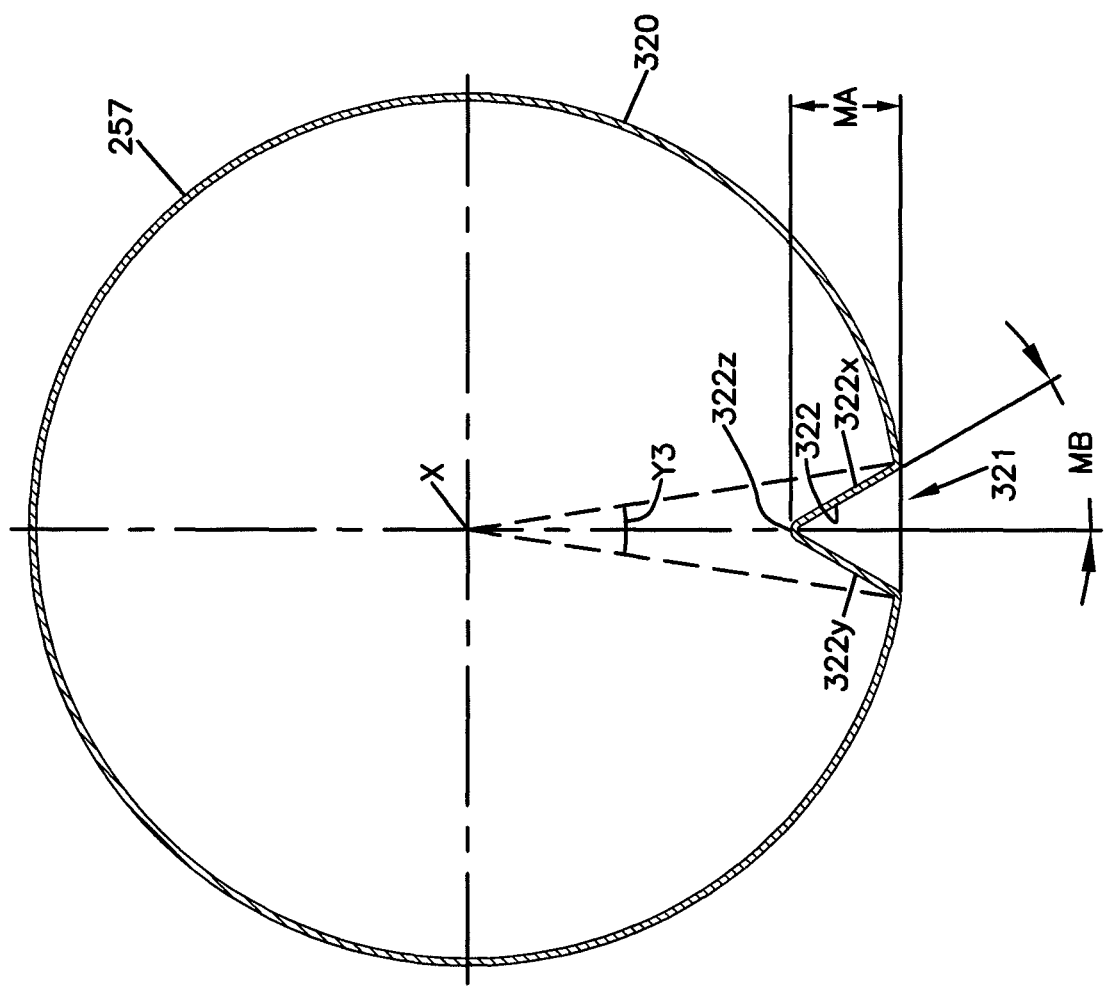
FIG. 36 is a schematic end elevational view of the outer liner of FIG. 35.

In FIG. 36, an end view of liner 257 is provided. It can be seen that liner 257 defines an outer perimeter 320 with a recess arrangement 321 therein, comprising at least one recess 322. The particular recess 322 depicted, extends radially inwardly from adjacent portions of the liner 257 at least 0.5 cm, typically at least 0.75 cm and often more. The particular recess 322 depicted, extends over an arcuate gap Y3 around perimeter 257p of at least 5°, and often within the range of 5°-50°, inclusive, relative to central axis X.

The particular recess 322 depicted has a V-shape, with opposite sides 322x, 322y extending radially outwardly from central 322v. Typically, the sides 322x, 322y extend radially outwardly at an angle, relative to vertex 322z at an angle of at least 5°, typically at least 20°, and often within the range of 20°-50°, inclusive, and usually not more than 80°.

When a metal liner is used, recess 322 can be formed using a press or similar operation.

In FIG. 36, some example dimensions are provided as follows: angle MB=30°; MA=10.9 mm.

It will be understood that assembly of cartridge 230 can be conducted in a manner analogous to the assembly described for FIGS. 11-16.

III. Selected Summary Comments and Observations

According to the present disclosure, air filter assemblies, components and features are described. There is no specific requirement that an assembly, component or feature include all of the detail characterized herein, in order to obtain some benefit according to the present disclosure. Also, methods of assembly, installation, removal and use are described, and again there is no specific requirement that the structure with which the method is performed include all of the features characterized, to obtain some benefit.

According to an aspect of the application, an air filter cartridge is provided which includes a media pack surrounding and defining an open filter interior; the media pack comprising filter media. The media has first and second, opposite, ends and defines a media inner perimeter and a media outer perimeter. The media can be pleated.

A first end piece is provided at the media first end. The first end piece includes a housing seal arrangement thereon. The housing seal arrangement can be a variety of seal configurations appropriate for sealing against a housing component, in use. Typically, the housing seal arrangement is provided in a manner such that it can be removably positioned against the housing, to allow servicing of the cartridge. This housing seal arrangement can be a radial seal, for example. Two general radial seal types, one radially inwardly directed, the other radially outwardly directed, are discussed.

A second end piece is provided at the media second end. The second end piece is typically a closed end piece.

Portions of the first and second end pieces can be molded-in-place.

At least a selected one of the first and second end pieces has an outer perimeter with a first recess arrangement therein. The first recess arrangement associated with one of the first and second end pieces comprises at least a first recess (i.e. an end piece recess) projecting radially inwardly from the selected one of the first and second end pieces in which it is positioned, to a location in overlap with a space between media sections, for example to a location at least 30%, typically at least 50% and usually at least 70% from adjacent outermost portions of the associated end piece in the media perimeter adjacent the end piece, toward a location corresponding to an innermost portion of the media inner perimeter. A first end piece recess generally extends completely, axially, through an associated one of the first and second end pieces.

The first recess arrangement can include a plurality of recesses corresponding generally to the first recess definition. However, examples are shown in which an end cap includes only one such recess therein. Typically, the end cap outer perimeter includes a region of at least 80°, typically at least 160°, and often at least 270°, of arcuate extension around a center of the end cap, in which there is no such recess positioned. The term "recess" in this context is not meant to refer to a recess of less than 4 mm and/or which is merely from mold centering features or other structures, and which does not overlap a region between media portions, such as between pleats.

In an example arrangement described, the first end piece recess has a generally v-shape with a radially innermost vertex on opposite sides extending radially outwardly from the vertex to the outer perimeter of the associated end cap. Typically, the angle of extension in the sides is at least 15°, usually not more than 80° and often within the range of 20°-70°, inclusive.

In example arrangements depicted, the media pack surrounds and defines a central longitudinal axis in the first end piece recess extends across an outer perimeter arc of at least 5°, typically not greater than 80°, relative to the central longitudinal axis. Typically, this arc of extension is within the range of 5°-50°, inclusive, for example 10°-40°, inclusive, although alternatives are possible.

In example arrangements described, the first end piece comprises an open end piece having a central aperture therethrough, and the second end piece is a closed end piece. In an example depicted, each has an end piece recess corresponding to first end piece recess therein.

An arrangement is described in which the media includes a first media recess arrangement therein, comprising at least a first media recess extending from the first end piece toward the second end piece, typically completely between the first and second end pieces, which has an arcuate extension in cross-section, along an outer perimeter, extending over an arcuate gap of at least 5°, no more than 50°, often within the range of 5°-50°, inclusive, typically 10°-40° to a media central axis. Typically, the first media recess is and axially aligned with the first end piece recess, and if present, an end piece recess in each of the first and second end caps.

Typically, the first media recess has a shape of a central radially inner vertex on opposite sides extending radially outwardly from the central radial inner vertex at an angle of at least 15°, and often within the range of 20°-70°, inclusive, typically not more than 80°. The first media pack recess can comprise a recess formed by spreading apart two adjacent outwardly directed pleats relative to other, adjacent, pleats.

In an example arrangement, the media is a continuous pleated loop, and an inner pleat tip extends across the vertex in the media recess.

Media packs are described which include an outer liner having a media pack recess therein, aligned with the position projecting into the media recess. The outer liner can be provided in a plastic form with such a recess, or a metal form, for example perforated metal, and/or expanded metal. Typically, the liner will be perforate, in the region of the recess.

The media pack recess arrangement and the outer liner will typically have a straight definition, with a cross-sectional definition defining an outwardly directed v-shape, with an inwardly projecting vertex and two sides, the sides extending outwardly from the vertex at an angle of at least 15°, typically not more than 80° and often within the range of 20°-70°, inclusive.

Typically, the media pack recess on the outer liner is continuous in extension between first and second end caps, although alternatives are possible. In any event, typically it extends axially a distance of at least 1.5 cm immediately adjacent a recess in at least one of the end pieces, and typically both end pieces.

An example media pack is characterized which has a generally conical outer perimeter, the definition referring to a general overall shape disregarding the media pack recess. The conical angle will typically be at least 0.25°. Another example is provided which has a generally cylindrical outer perimeter, again the cylindrical shape being defined disregarding the media pack recess.

Alternate air filter cartridge definitions are provided, which use various selected ones of the features characterized above.

An air cleaner assembly is provided which includes a housing having an air flow inlet arrangement and air flow outlet arrangement and access cover, and a cartridge, for example with features generally characterized herein, positioned within an interior of the housing. In an example, the housing includes an interior radial projection arrangement having a radial projection portion projecting into the first, end piece, recess (in one or other of the first and second end pieces). The housing can include an interior radial projection arrangement having a radial projection portion projecting into a media pack recess. The interior radial projection arrangement of the housing can comprise an interior portion of the utility conduit recess and an outer surface of a sidewall of the housing. The utility conduit recess can, for example, comprise a trough extending completely between opposite ends of the sidewall.

In an example described, a restriction indicator line is positioned in the utility conduit recess, exteriorly of the housing. The restriction indicator line can terminate at a visual display portion of a restriction indicator, also received at least partially within the recess. The housing can include an access cover similarly having a perimeter recess therein, to allow for recess therein, of a portion of the restriction indicator arrangement, and allow viewing the restriction indicator arrangement without removal of the access cover.

In another example arrangement, the housing includes a projection extending into a recess in one of the end caps and the media pack, without having a projection extending under a recess of an opposite end cap.

Typically, when the utility conduit recess is present, is at least 1 cm deep.

In example assemblies, an interference fit is provided by a projection of the housing extending into one or more of the perimeter recesses of the cartridge, inhibiting the cartridge from rotation, relative to the housing projection, by any more than 25°, preferably more than 15°.

Methods of assembly and use, as well as installation and removal are also described.

Again, there is no requirement that an arrangement, assembly, technique, method or application include all of the features characterized herein, in order to obtain some benefit according to the present disclosure.

What is claimed:

1. An air filter cartridge comprising:
   (a) a media pack comprising filter media surrounding and defining an open filter interior;
      (i) the filter media having first and second, opposite, ends;
   (b) a first end piece at the media pack first end;
      (i) the first end piece having a housing seal arrangement thereon;
   (c) a second end piece at the media pack second end; and,
      (ii) the media pack including a recess arrangement therein comprising at least a first media pack recess extending from the first end piece to the second end piece and having an arcuate extension, along an outer perimeter of the media pack, extending over an arcuate gap within the range of 5°-50°, inclusive, relative to a media pack central longitudinal axis;
   (d) a recess arrangement comprising at least a first, end cap, recess positioned in, and extending completely through, one of the first and second end pieces, in axial alignment with the first media pack recess; and,
   (e) the media pack defines a generally conical outer perimeter.

2. An air filter cartridge according to claim 1 wherein
   (a) the recess arrangement includes a first end cap recess projecting radially inwardly from an outer perimeter of the first end piece to a location at least 30% of a distance from adjacent outermost portions of a media outer perimeter toward a location corresponding to an innermost portion of a media inner perimeter.

3. An air filter cartridge according to claim 2 wherein:
   (a) the first, end cap, recess projects radially inwardly from an outer perimeter of the first end piece to a location at least 50% of a distance toward a location corresponding to an adjacent innermost portion of the media inner perimeter.

4. An air filter cartridge according to claim 2 wherein:
   (a) the first, end cap, recess projects radially inwardly from the outermost portion of the outer perimeter of the first end piece to a location at least 70% of a distance toward a location corresponding to an adjacent innermost portion of a media inner perimeter.

5. An air filter cartridge according to claim 2 wherein:
   (a) the end cap recess has a v-shape with a radially innermost vertex and opposite sides.

6. An air filter cartridge according to claim 2 wherein:
   (a) the end cap recess has a v-shape with a radially innermost vertex and opposite sides extending radially outwardly at an angle of at least 15°.

7. An air filter cartridge according to claim 2 wherein:
   (a) the end cap recess has a v-shape with a radially innermost vertex and opposite sides extending radially outwardly at an angle of no more than 80°.

8. An air filter cartridge according to claim 2 wherein:
   (a) the end cap recess has a v-shape with a radially innermost vertex and opposite sides extending radially outwardly at an angle within the range of 20°-70°, inclusive.

9. An air filter cartridge comprising:
   (a) a media pack comprising filter media surrounding and defining an open filter interior;
      (i) the filter media having first and second, opposite, ends;
   (b) a first end piece at the media pack first end;
      (i) the first end piece having a housing seal arrangement thereon;
   (c) a second end piece at the media pack second end; and,
      (i) the media pack including a recess arrangement therein comprising at least a first media pack recess extending from the first end piece to the second end piece and having an arcuate extension, along an outer perimeter of the media pack, extending over an arcuate gap within the range of 5°-50°, inclusive, relative to a media pack central longitudinal axis;
   (d) a recess arrangement comprising at least a first and second, end cap, recesses each one of first and second end pieces including one of the first and second end cap recesses, respectively, therein and extending completely therethrough in axial alignment with the first media pack recess;
      (i) each one of the first and second, end cap, recesses extending, radially, from adjacent portions an outer perimeter of an associated end piece, inwardly an amount corresponding to a distance of at least 15% of a distance toward a central longitudinal axis of the filter cartridge and in axial alignment the first media pack recess; and,
   (e) each end piece including only one end cap recess therein that extends at least 0.5 cm radially inwardly.

10. An air filter cartridge according to claim 9 wherein:
    (a) the first end piece comprises an open end piece having a central aperture therethrough; and,
    (b) the housing seal arrangement comprises an inwardly directed radial seal positioned in the central aperture of the first end piece.

11. An air filter cartridge according to claim 9 wherein:
    (a) the first, end cap, recess extends, radially, from adjacent an outer perimeter of an associated end cap piece, inwardly an amount corresponding to a distance of at least 5% of a distance toward a central longitudinal axis of the air filter cartridge.

12. An air filter cartridge according to claim 9 wherein:
    (a) the media pack defines an outer perimeter and an inner perimeter; and,
    (b) the first end cap recess extends a distance, from and adjacent a portion of the media outer perimeter toward the media inner perimeter corresponding to at least 30% of a distance between adjacent portions of the media outer perimeter and the media inner perimeter at a location adjacent the end cap with the first, end cap, recess thereon.

13. An air filter cartridge according to claim 9 wherein:
    (a) the first end cap recess comprises a radially inner vertex and outwardly projecting sides extending at an angle within the range 20°-70°, inclusive, relative to the vertex;
    (b) the second end cap recess comprises a radially inner vertex and outwardly projecting sides extending at an angle within the range of 20°-70°, inclusive, relative to the vertex; and,
    (c) the first media pack recess comprises a radially inner vertex and outwardly projecting sides extending at an angle within the range of 20°-70°, inclusive, relative to the vertex.

14. An air filter cartridge according to claim 9 wherein:
    (a) the media pack defines a generally cylindrical outer perimeter.

15. An air filter cartridge comprising:
    (a) a media pack comprising filter media surrounding and defining an open filter interior;
       (i) the filter media having first and second, opposite, ends;

(b) a first end piece at the media pack first end;
  (i) the first end piece having a housing seal arrangement thereon;
(c) a second end piece at the media pack second end; and,
  (ii) the media pack including a recess arrangement therein comprising at least a first media pack recess extending from the first end piece to the second end piece and having an arcuate extension, along an outer perimeter of the media pack, extending over an arcuate gap within the range of 5°-50°, inclusive, relative to a media pack central longitudinal axis;
(d) a recess arrangement comprising at least a first, end cap, recess positioned in, and extending completely through, one of the first and second end pieces, in axial alignment with the first media pack recess; and,
(e) each end cap includes only one end cap recess therein that extends at least 0.5 cm radially inwardly.

16. An air filter cartridge comprising:
(a) a media pack comprising filter media surrounding and defining an open filter interior;
  (i) the filter media having first and second, opposite, ends; and,
  (ii) the media pack defining a generally conical outer perimeter;
(b) a first end piece at the media pack first end;
  (i) the first end piece having a housing seal arrangement thereon;
(c) a second end piece at the media pack second end; and,
  (i) the media pack including a recess arrangement therein comprising at least a first media pack recess extending from the first end piece to the second end piece and having an arcuate extension, along an outer perimeter of the media pack, extending over an arcuate gap within the range of 5°-50°, inclusive, relative to a media pack central longitudinal axis;
(d) a recess arrangement comprising at least a first and second, end cap, recesses each one of first and second end pieces including one of the first and second end cap recesses, respectively, therein and extending completely therethrough in axial alignment with the first media pack recess;
  (i) each one of the first and second, end cap, recesses extending, radially, from adjacent portions an outer perimeter of an associated end piece, inwardly an amount corresponding to a distance of at least 15% of a distance toward a central longitudinal axis of the filter cartridge and in axial alignment the first media pack recess.

* * * * *